(12) United States Patent
Suchter et al.

(10) Patent No.: US 8,706,798 B1
(45) Date of Patent: Apr. 22, 2014

(54) SYSTEMS, METHODS, AND DEVICES FOR DYNAMIC RESOURCE MONITORING AND ALLOCATION IN A CLUSTER SYSTEM

(71) Applicant: Pepperdata, Inc., Sunnyvale, CA (US)

(72) Inventors: Sean Andrew Suchter, Los Altos Hills, CA (US); Charles C. Carson, Jr., Cupertino, CA (US); Kimoon Kim, Cupertino, CA (US); Choongsoon Chang, Palo Alto, CA (US); Scott Alexander Banachowski, Mountain View, CA (US); Judith A. Hay, Basel (CH)

(73) Assignee: Pepperdata, Inc., Sunnyvale, CA (US)

( * ) Notice: Subject to any disclaimer, the term of this patent is extended or adjusted under 35 U.S.C. 154(b) by 0 days.

(21) Appl. No.: 14/053,044

(22) Filed: Oct. 14, 2013

Related U.S. Application Data

(60) Provisional application No. 61/841,007, filed on Jun. 28, 2013, provisional application No. 61/841,074, filed on Jun. 28, 2013, provisional application No. 61/841,127, filed on Jun. 28, 2013, provisional application No. 61/841,025, filed on Jun. 28, 2013, provisional application No. 61/841,106, filed on Jun. 28, 2013, provisional application No. 61/841,061, filed on Jun. 28, 2013.

(51) Int. Cl.
*G06F 15/16* (2006.01)
*G06F 15/173* (2006.01)

(52) U.S. Cl.
USPC ............ 709/202; 709/203; 709/224; 709/226

(58) Field of Classification Search
USPC ........... 709/201, 203, 223, 224, 226; 718/103
See application file for complete search history.

(56) References Cited

U.S. PATENT DOCUMENTS

| 7,584,275 | B2 * | 9/2009 | Shirota .......................... 709/223 |
| 7,590,983 | B2 * | 9/2009 | Neiman et al. ................ 709/203 |
| 2002/0065864 | A1 * | 5/2002 | Hartsell et al. ................ 709/223 |
| 2002/0152305 | A1 * | 10/2002 | Jackson et al. ................ 709/224 |
| 2002/0174227 | A1 * | 11/2002 | Hartsell et al. ................ 709/226 |
| 2006/0031842 | A1 * | 2/2006 | Neiman et al. ................ 718/103 |
| 2007/0260669 | A1 * | 11/2007 | Neiman et al. ................ 709/201 |

* cited by examiner

*Primary Examiner* — Quang N Nguyen

(74) *Attorney, Agent, or Firm* — Knobbe, Martens, Olson & Bear, LLP

(57) ABSTRACT

In an embodiment, the systems, methods, and devices disclosed herein comprise a computer resource monitoring and allocation system. In an embodiment, the resource monitoring and allocation system can be configured to allocate computer resources that are available on various nodes of a cluster to specific jobs and/or sub-jobs and/or tasks and/or processes.

16 Claims, 27 Drawing Sheets

Cluster

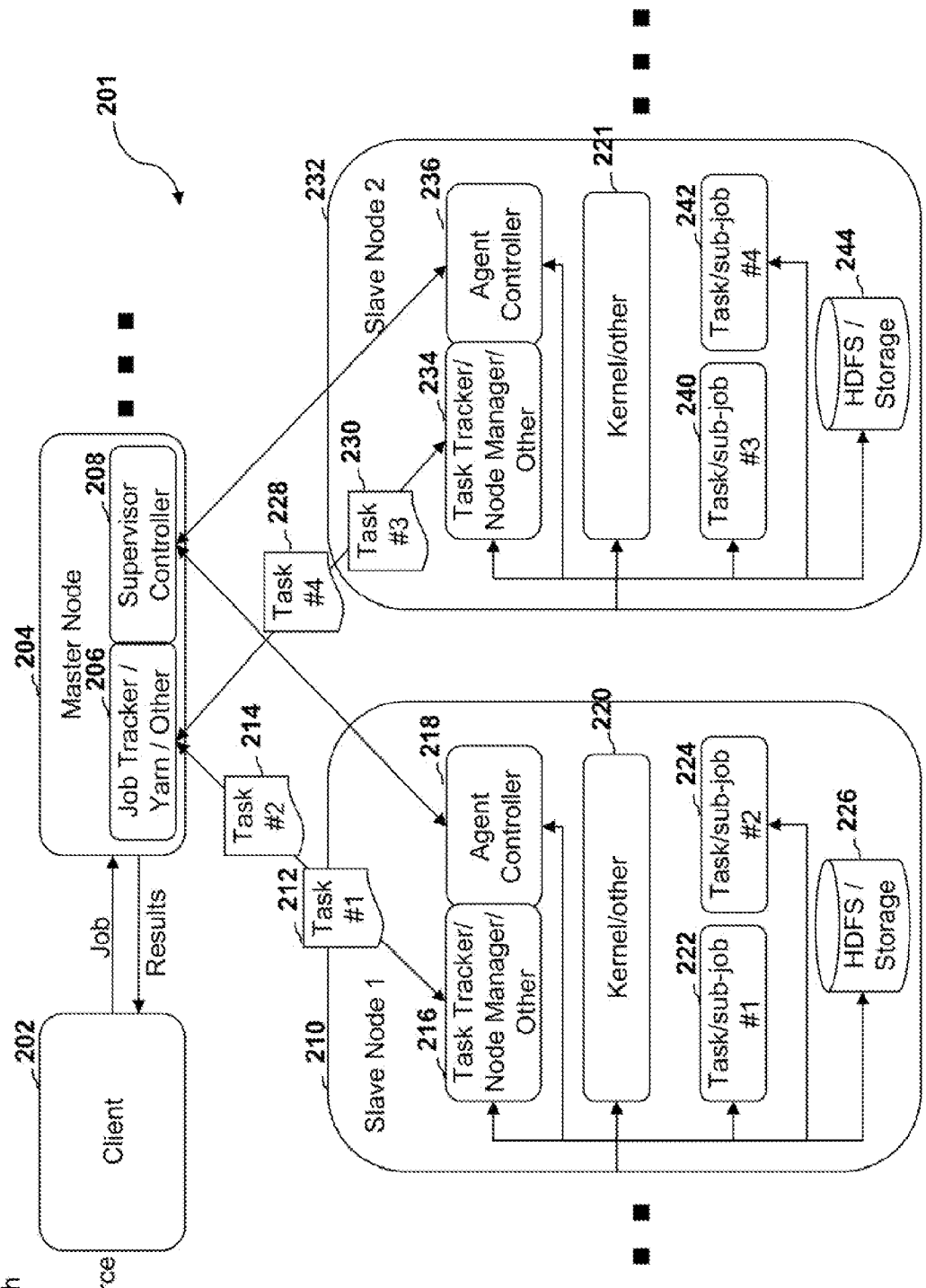

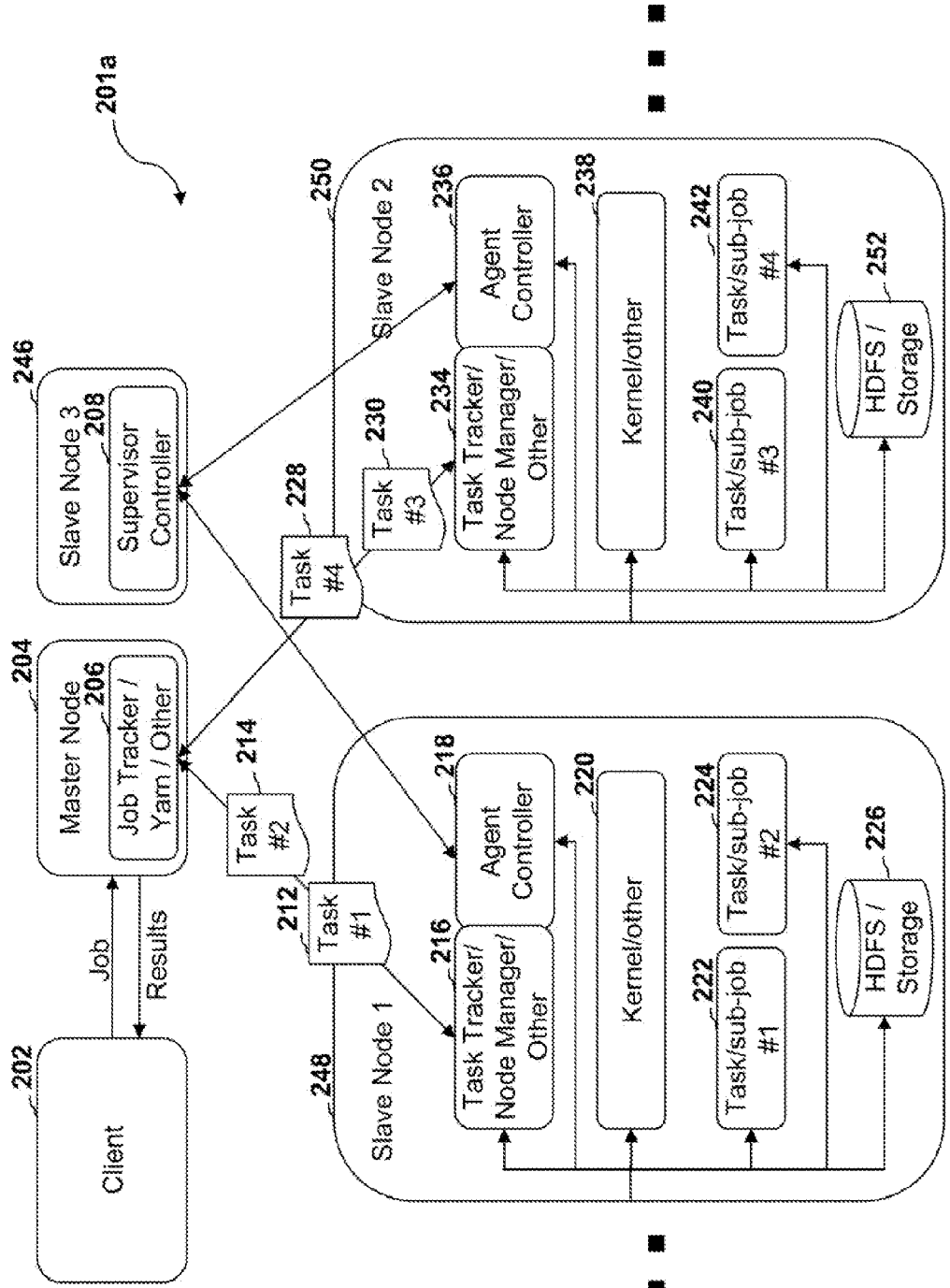

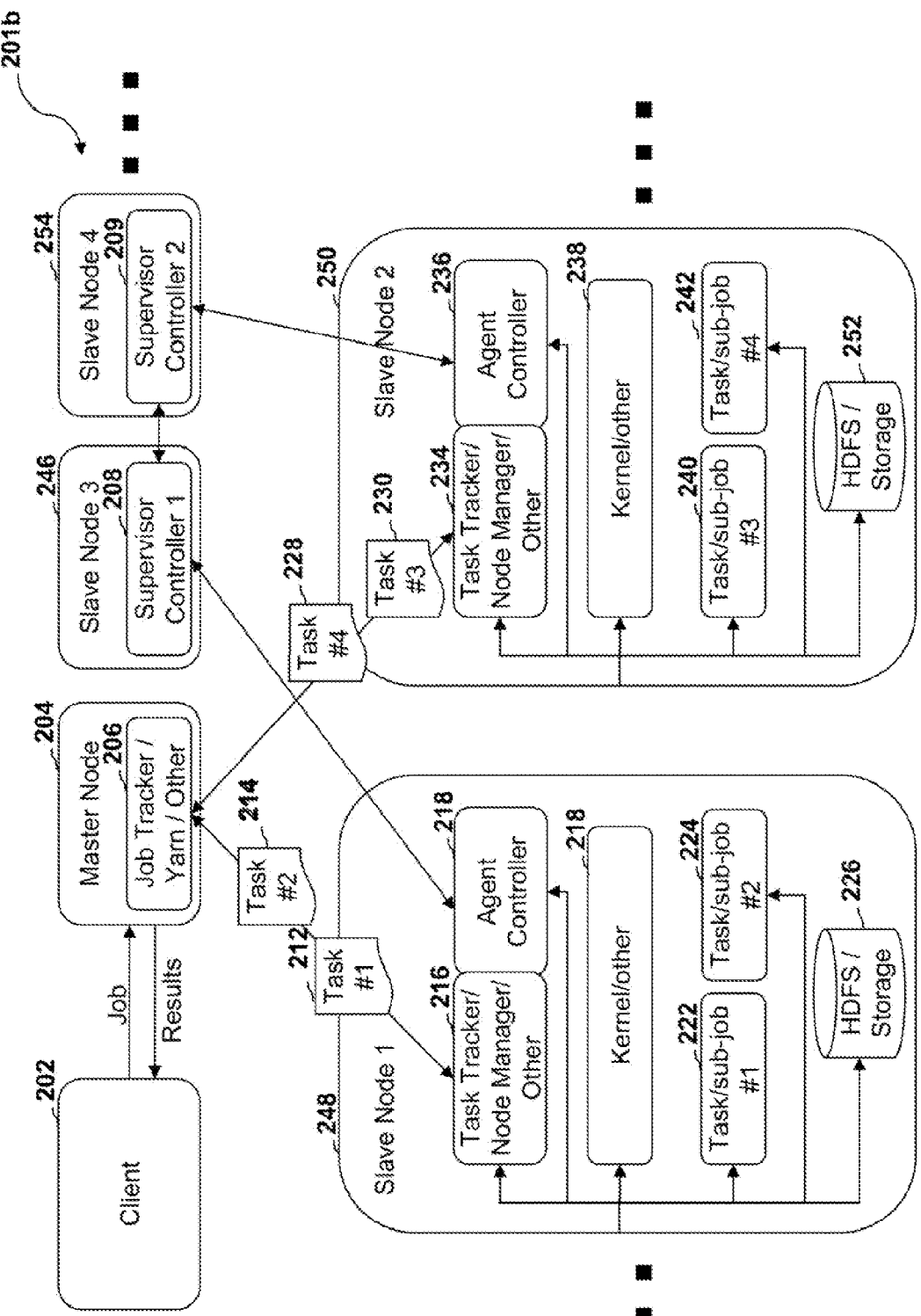

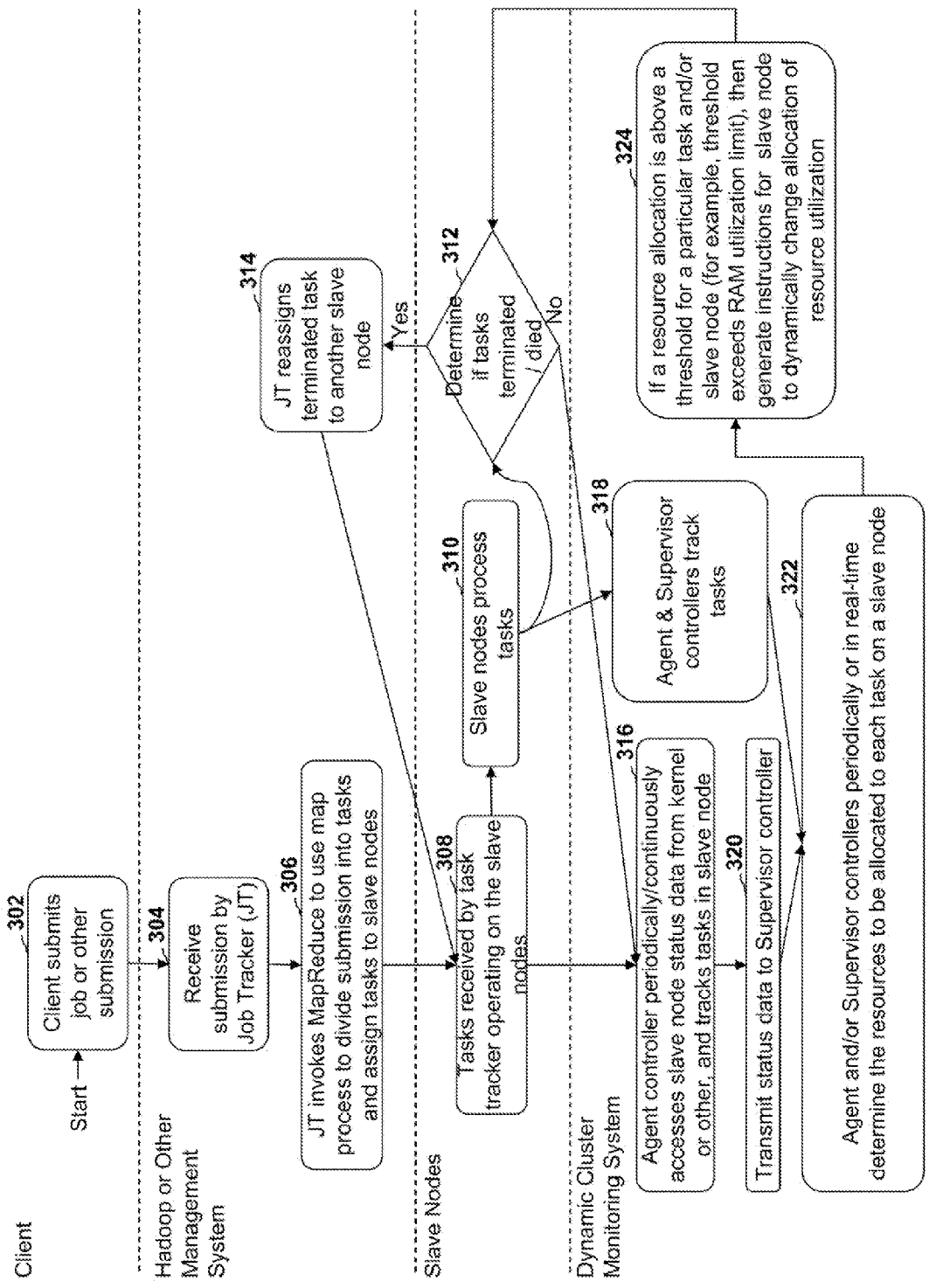

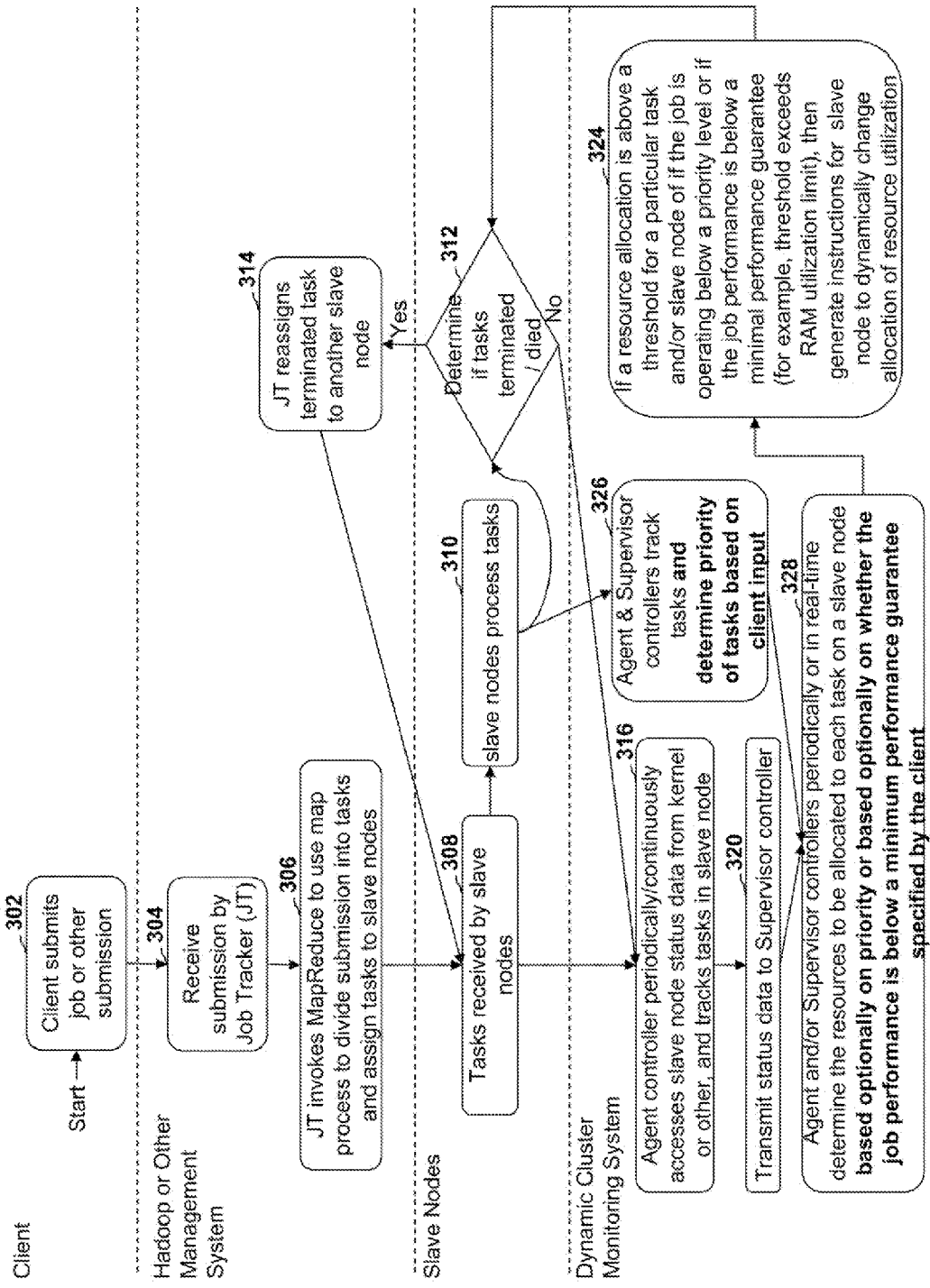

Cluster With Dynamic Monitoring and Resource Allocation

Distributor

Distributor

Virtual Cluster

Virtual Cluster

Virtual Cluster

Virtual Cluster

Virtual Cluster

Virtual Cluster

Virtual Cluster

Job Groups

Monetizing and/or Budget Accounting of Resources

Heterogeneous Clusters

Heterogeneous Clusters

Job Histories

Reporting System to Generate Recommendation For Hardware Modifications / Additions

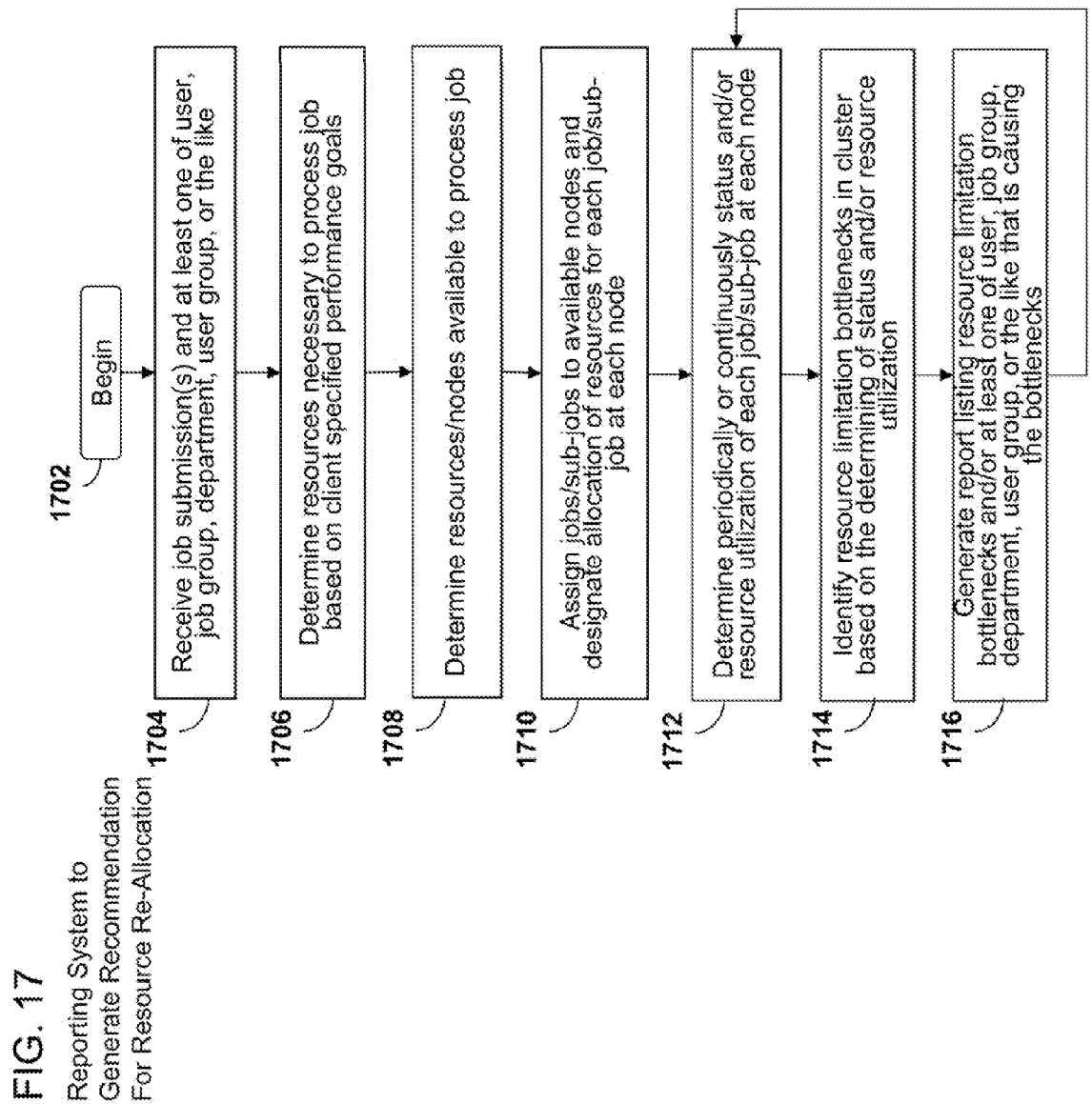

Resource Limitation Testing

Cluster With Dynamic Monitoring and Resource Allocation for Non-Hadoop Implementations

SYSTEMS, METHODS, AND DEVICES FOR DYNAMIC RESOURCE MONITORING AND ALLOCATION IN A CLUSTER SYSTEM

CROSS-REFERENCE TO RELATED APPLICATIONS

The present application claims the benefit under 35 U.S.C. 119(c) to U.S. Provisional Application No. 61/841,007, filed Jun. 28, 2013 and titled SYSTEMS, METHODS, AND DEVICES FOR DYNAMIC RESOURCE MONITORING AND ALLOCATION IN A CLUSTER SYSTEM. The present application claims the benefit under 35 U.S.C. 119(c) to U.S. Provisional Application No. 61/841,074, filed Jun. 28, 2013 and titled SYSTEMS, METHODS, AND DEVICES FOR DYNAMIC RESOURCE MONITORING AND ALLOCATION IN A CLUSTER SYSTEM. The present application claims the benefit under 35 U.S.C. 119(c) to U.S. Provisional Application No. 61/841,127, filed Jun. 28, 2013 and titled SYSTEMS, METHODS, AND DEVICES FOR DYNAMIC RESOURCE MONITORING AND ALLOCATION IN A CLUSTER SYSTEM. The present application claims the benefit under 35 U.S.C. 119(c) to U.S. Provisional Application No. 61/841,025, filed Jun. 28, 2013 and titled SYSTEMS, METHODS, AND DEVICES FOR DYNAMIC RESOURCE MONITORING AND ALLOCATION IN A CLUSTER SYSTEM. The present application claims the benefit under 35 U.S.C. 119(c) to U.S. Provisional Application No. 61/841,106, filed Jun. 28, 2013 and titled SYSTEMS, METHODS, AND DEVICES FOR DYNAMIC RESOURCE MONITORING AND ALLOCATION IN A CLUSTER SYSTEM. The present application claims the benefit under 35 U.S.C. 119(c) to U.S. Provisional Application No. 61/841,061, filed Jun. 28, 2013 and titled SYSTEMS, METHODS, AND DEVICES FOR DYNAMIC RESOURCE MONITORING AND ALLOCATION IN A CLUSTER SYSTEM. The foregoing applications are hereby incorporated herein by reference in their entirety, including specifically but not limited to the systems and methods relating to dynamic resource monitoring and allocation in a cluster computer system.

BACKGROUND

1. Field

The embodiments of the disclosure generally relate to computer clusters, and more particularly to systems, methods, and devices for the efficient management of resources of computer clusters.

2. Description of the Related Art

In general, a computer cluster comprises a set of connected computers that communicate and work together in order to act as a single system. A computer cluster can comprise several types of components, including a fast local area network, a plurality of computers referred to generally as nodes, and operating systems running on each node. An advantage of computer clusters is the ability to utilize low cost computer servers in order to achieve high performance distributed computing that was only previously available through the use of highly expensive main frame computers. A disadvantage of computer clusters is the increased operational challenges that arise when adding more and more nodes to the computer cluster. Generally, in order to manage the operational complexities of vast numbers of nodes in a computer cluster, a software layer can be employed to manage the activities of the various computing nodes in order to allow the users to treat the computer cluster as a single computing unit.

Typically, the software layer for organizing the nodes and orchestrating the activities on the nodes can be responsible for receiving jobs to be processed by the computer cluster. In many instances, the software layer will divide the job into several tasks or sub-jobs or processes or job processes to be processed by various nodes in the computer cluster. Generally, the software layer is responsible for distributing these tasks and or sub-jobs or processes or job processes to the available nodes in the computer cluster. This distribution of tasks or sub-jobs or processes or job processes to the various available nodes in a computer cluster can lead to performance degradations and/or resource underutilization.

SUMMARY

Various embodiments of the present invention relate to the utilization of computer cluster technology, which generally refers to a plurality of computer servers connected to each other through a fast network connection. In an embodiment, the systems, methods, and devices disclosed herein comprise a computer resource monitoring and allocation system. In an embodiment, the resource monitoring and allocation system can be configured to allocate computer resources that are available on various nodes of a cluster to specific jobs and/or sub-jobs and/or tasks and/or processes. For example, the system can be configured to control network utilization across two or more nodes wherein the system can reduce network utilization of a first job that is being performed on a first node in order to allocate additional network capacity to a second job or sub-job that is being performed on a second node. In another example, the system can be configured to reduce the amount of CPU usage on a single particular node that a first job or sub-job is using on the node in order to allocate additional CPU capacity to a second job or sub-job or process or job process operating on the node.

Generally, the systems and methods herein are configured to process large amounts of data received from the various nodes in a cluster in order to generate, in real time or in substantially real time or on a periodic basis, instructions for allocating computer resources on the nodes in the cluster. In an embodiment, the system is configured to dynamically tune or adjust up or down access to or availability of the computer resources provided for on particular nodes in order to ensure that user-defined goals are satisfied and/or to ensure that the cluster is operating efficiently. In general, the system is configured to continuously and/or periodically receive data relating to resource allocation and/or usage at particular nodes. Additionally, the system can be configured to continuously and/or periodically generate instructions for allocating computer resources at particular nodes for specific jobs and/or sub-jobs being performed on the nodes of the cluster. The continuous and dynamic changing of resource allocations on a computer cluster in combination with the continuous and/or periodic monitoring of the resource allocations and/or usage on particular nodes of a cluster results in thousands of transactions over a short period of time, and makes it impossible for a human being to perform such tasks entirely in a person's mind or by a person using a writing instrument and paper.

Through the continuous monitoring of the nodes in the cluster and through the dynamic allocation of computer resources on particular nodes, the system can be configured to ensure that jobs and/or sub-jobs that have high prioritization are completed as soon as possible and/or by a user-defined time period. The systems, methods, and devices disclosed herein can be utilized in conjunction with specific computer cluster types, such as hadoop clusters, or can be configured to operate with other distributed systems.

In an embodiment, a hadoop computer cluster comprises a master node computing device comprising a management controller and a supervisor controller, the management controller configured to coordinate parallel processing of data across a plurality of computer system nodes, the supervisor controller configured to coordinate allocation of system resources at particular computer system nodes to particular tasks. The plurality of computer system nodes can be configured to communicate with the supervisor controller and to perform processing of received tasks. In an embodiment, the computer system nodes each comprise: one or more processors configured to perform computing processes on received tasks and an agent controller. In an embodiment, the agent controller is configured to monitor utilization by tasks of system resources of the computer system node, the system resources comprising CPU, disk input/output, network, and memory by the computer system node. In an embodiment, the agent controller is configured to report the monitored system resource utilization to the supervisor in substantially real-time. In an embodiment, the agent controller is configured to generate instructions for controlling utilization by tasks of system resources of the computer system node, the instructions based on data received from the supervisor controller. The supervisor controller can be configured to, based on goals specified by an operator of the hadoop computer cluster and the substantially real-time reporting from a plurality of agent controllers, determine assignment of tasks to respective computer system nodes and/or resource allocations for each task on those nodes such that the operator-specified goals are satisfied and processing capabilities of the hadoop computer cluster are maximized. In an embodiment, the management controller comprises a job tracker. In an embodiment, the management controller comprises a yarn system or yarn resource manager.

In an embodiment, a supervisor controller is configured to manage system resource allocation for a hadoop computer cluster. The supervisor controller can comprise a management controller interface configured to communicate with a management controller to access data representing an assignment of a plurality of job processes across a plurality of computer system nodes in the hadoop computer cluster, the management controller configured to coordinate parallel processing of data across a plurality of computer system nodes, an agent controller interface configured to communicate with an agent controller, the agent controller configured to transmit to the agent controller interface data representing utilization of system resources by the plurality of job processes operating on a particular computer system node, a system resource allocation engine configured to dynamically determine system resource allocations for particular job processes operating on particular computer system nodes, the dynamic determination generated by the system resource engine based on the data representing utilization of system resource by the plurality of job processes operating on the particular system node; and the agent controller interface configured to generate data for transmission to the agent controller of a particular computer system node based on the dynamic determination generated by the system resource engine, the data configured to instruct the agent controller to allocate a level of system resources to a particular job process operating on the particular computer system node.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the embodiments of the invention are described in detail below with reference to the drawings of various embodiments, which are intended to illustrate and not to limit the invention. The drawings comprise the following figures in which:

FIG. 2 is an embodiment of a schematic diagram illustrating a computer cluster comprising an embodiment of a dynamic monitoring and/or resource allocation system.

FIG. 2A is an embodiment of a schematic diagram illustrating a computer cluster comprising an embodiment of a dynamic monitoring and/or resource allocation system.

FIG. 2B is an embodiment of a schematic diagram illustrating a computer cluster comprising an embodiment of a dynamic monitoring and/or resource allocation system.

FIG. 3 is a flowchart depicting an embodiment of a process for dynamically monitoring and/or allocating resources across a computer cluster.

FIG. 3A is a flowchart depicting an embodiment of a process for dynamically monitoring and/or allocating resources across a computer cluster.

FIG. 17 is a flowchart depicting an embodiment of a process for generating reports relating to resource reallocation on a computer cluster.

DETAILED DESCRIPTION OF THE EMBODIMENTS

Figure 1:
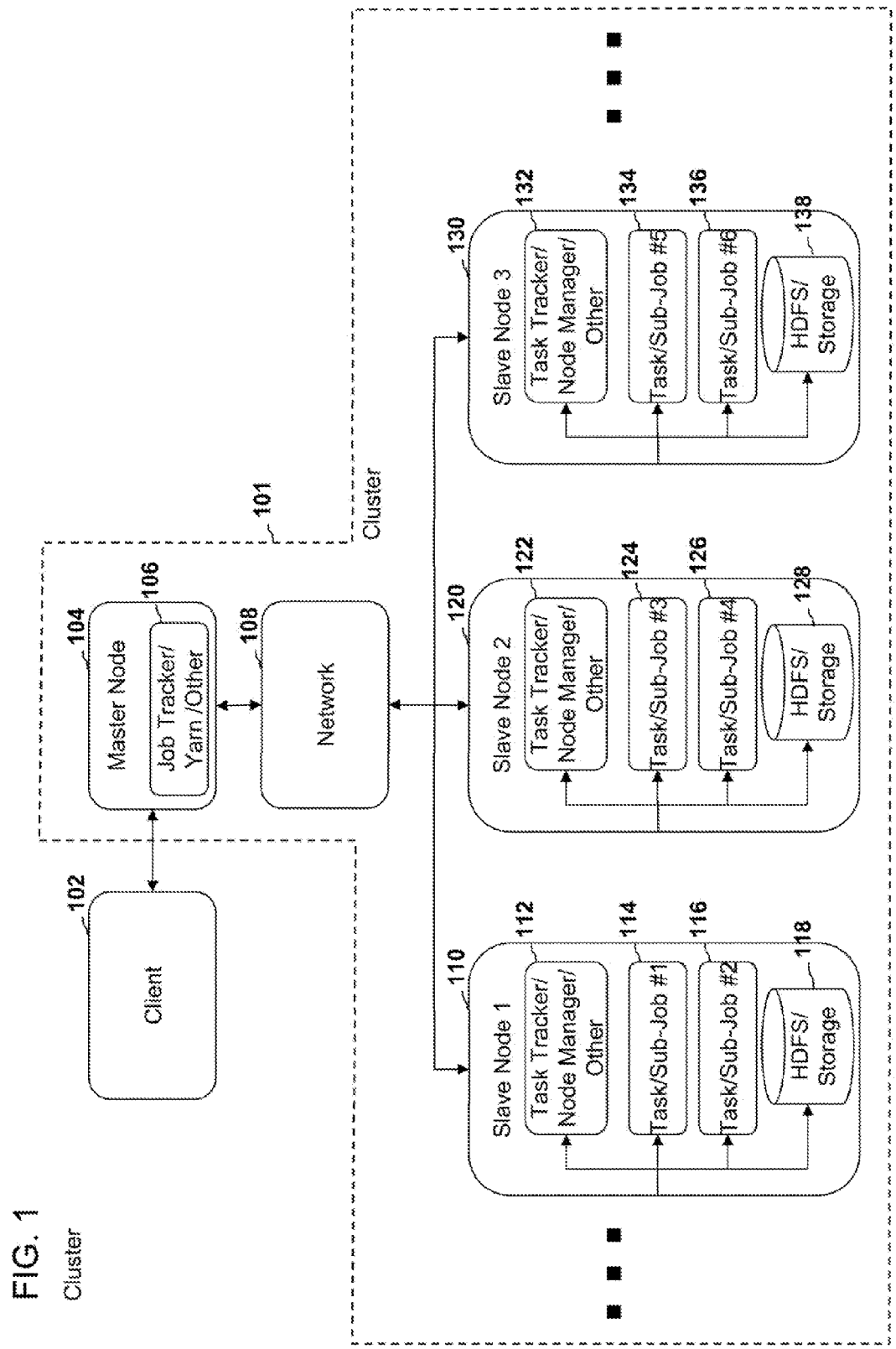
FIG. 1 is an embodiment of a schematic diagram illustrating a computer cluster.

Although several embodiments, examples and illustrations are disclosed below, it will be understood by those of ordinary skill in the art that the inventions described herein extend beyond the specifically disclosed embodiments, examples, and illustrations, and include other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limiting or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

In general, computer clusters comprise a plurality of computer servers that are connected to each other through a network connection. In many instances, the network connection is a fast network connector such that all of the computer servers in the cluster can communicate with each other quickly and efficiently. For example, a computer cluster can comprise a number of low cost commercially available off-the-shelf computers connected through a fast local area network (LAN). In general, a computer cluster can comprise a master node and a plurality of slave nodes. The master node can be configured to coordinate the activities of the slave nodes. In an embodiment, the computer hardware for a master node and for slave nodes are the same or are substantially the same, and are only distinguishable by the assigned roles each computer server receives when the cluster has been created. In an embodiment, a cluster can comprise one or more master nodes that coordinate the activities of various slave nodes.

To implement the coordination between the master node(s) and the various slave nodes, a computer cluster can comprise middleware software that operates on each node and that allows communication and coordination between the nodes in order for the computer cluster to act like a single cohesive computing unit. In general, a master node can be configured to divide jobs and/or processes into smaller jobs and/or processes to be executed or processed on one or more slave nodes in order to efficiently and quickly complete the job. After transmitting a sub-job to a slave node, a master node generally does not monitor the performance of the processing of the sub-job. In some cases, the master node will only determine whether a sub-job has been completed by a designated slave node.

Accordingly, there are several disadvantages for typical cluster configurations. For example, by not verifying or monitoring the status of a sub-job that is being processed by a slave node, a computer cluster system may not be able to process a particular job within a time frame desired by the user. Further, by not monitoring and verifying the progress of a sub-job, the cluster system runs the risk of slowing down high priority jobs when the master node adds additional jobs to a particular slave node. For example, a computer cluster can be configured to run a job for generating reports on a daily basis. In an embodiment, the computer cluster can be configured to receive additional jobs during the period in which the cluster is working on the job for generating the periodic reports. In such an example, the master node can be configured to divide the additional job into sub-jobs for further processing by various nodes in the cluster. These additional sub-jobs to be processed by the slave nodes can in some instances slow down the completion of the job for generating the periodic reports.

Without monitoring the progress and/or completion of the job and/or a plurality of jobs for generating the reports, the computer cluster cannot determine whether the addition of such ad hoc jobs that are added to a node are slowing down the time sensitive periodic report generation job. Accordingly, it can be advantageous for a cluster system to monitor the completion progress of a particular job and/or a plurality of jobs in order to ensure that such jobs are completed on a timely basis pursuant to the specified goals of a user.

Typical computer clusters cannot efficiently handle the addition of ad hoc jobs without affecting the performance of jobs that are regularly scheduled for processing by the cluster. Additionally, typical clusters cannot determine whether a particular node is being overloaded by jobs assigned to the slave node. The overutilization of resources on a slave node can cause the slave node to experience performance degradations.

For example, if the sub-jobs assigned to a slave node required the use of RAM that exceeds the amount of physical RAM on the node, the slave node can start to utilize the hard drive to compensation for the lack of RAM. Writing to a hard drive in order to compensate for the lack of RAM can cause the slave node to experience significant performance delays because writing to a hard drive is slower than writing to physical RAM or flash memory. The writing to and reading from a hard drive in lieu of RAM or flash memory can cause severe performance degradations, which can cause "thrashing" of the computer server, requiring the computer server to be rebooted.

As an example, if multiple sub-jobs assigned to a slave node requested more disk I/O accesses per unit time than the node can support, one or more of the tasks can be slowed down dramatically waiting for disk I/O access. In some cases, the task(s) that may be slowed down could be the high-priority regularly scheduled task(s), being slowed down by the ad hoc jobs.

Without the active and dynamic monitoring of the resources on a slave node with respect to the jobs and/or sub-jobs assigned to the slave node, the computer cluster cannot account for resource overloads on a particular slave node.

Similarly, without monitoring the resource utilization on the slave nodes within a cluster, the system cannot determine which slave nodes are being underutilized. For example, certain sub-jobs may not require significant amounts of RAM in order to be processed. In certain circumstances, it can be advantageous for the cluster to assign additional sub-jobs to the slave node in order to utilize the available RAM on the slave node. The additional assignment of jobs and/or sub-jobs for the slave node can ensure that the resources of the slave node are being fully utilized.

Typical clusters also do not have the ability to determine which jobs, sub-jobs, processes and/or users are utilizing the cluster to a greater extent than other jobs and/or users. For example, typical cluster systems cannot determine whether a human resource group is responsible for a greater utilization of the cluster relative to a legal department of an organization. By not monitoring the resource utilization of sub-jobs on slave nodes, the cluster system cannot determine how much of the resources of the cluster are being utilized by particular jobs and/or users and/or groups of users. It can be advantageous to determine the percent usage of the cluster by a particular job and/or user and/or groups of users in order to bill such utilization to a particular job and/or user and/or group of users and/or company department or the like. For example, if the system is configured to determine that a human resource department utilizes 50% of the resources of the cluster, the system can be configured to bill or perform a budgetary accounting that causes the human resources department of a company to be responsible for 50% of the costs for maintaining the cluster for the company.

Another drawback to typical computer clusters is the system cannot generally determine what additional hardware should be added to the cluster in order to efficiently process the jobs and/or sub-jobs being sent to the cluster for processing. Without monitoring the performance of jobs and/or sub-jobs being processed by specific slave nodes, the computer cluster cannot determine whether bottlenecks exist in the computer cluster, wherein the bottlenecks prevent the completion of a job and/or sub-job in a timely manner. For example, a system that can be configured to monitor and determine the resource utilization at particular slave nodes by particular sub-jobs, can be configured to identify overutilization of RAM in the cluster. Based on the determination that RAM utilization across the cluster is consistently above the available RAM capacity of the cluster, the system can be configured to output a message to the user or operator of the cluster to add additional slave nodes with increased RAM capacity.

In general, typical computer clusters require that the computer servers making up the cluster be of the same or similar type of machines. Accordingly, in many instances computer clusters cannot generally comprise heterogeneous machine types. For example, many computer clusters cannot efficiently operate in an environment where some of the computer servers have faster CPU processors than other computers in the cluster. For example, without monitoring the available resources on particular slave nodes, the cluster system cannot determine that certain slave nodes with faster CPU processors can be configured to take on additional sub-jobs as compared to other slave nodes in the cluster that have slower CPU processors that can take on only a limited number of sub-jobs. Therefore, it can be advantageous for a computer cluster to dynamically monitor and allocate resources on a particular slave node in order to allow a cluster system to fully utilize heterogeneous computer servers in a cluster.

The foregoing shortcomings and disadvantages of typical computer clusters can be addressed by the resource monitoring and allocation systems disclosed herein. In an embodiment, the system can be configured to monitor, track, and dynamically control system resources at a per-task/per-process level, an overall per-node level, and an overall per-cluster level in order to maximize the efficiency and/or utilization of the resources provided for by the nodes in the cluster. The system resources include but are not limited to CPU usage, RAM usage (both actual usage and current max limits as set via the virtual machine or kernel), network bandwidth usage, and disk I/O usage (read bandwidth, write bandwidth, and number of disk operations/seeks). In an embodiment, the system can be configured to monitor, track, and dynamically control at a per-task/per-process level, an overall per-node level, and an overall per-cluster level several fine-grained resources including but not limited to:

Disk I/O on a per-device basis; for example, a node with multiple physical disk drives will generally have read/write bandwidth, seeks, and operations monitored/controlled for each of the physical disk drives as well as overall.

Network bandwidth broken down by type of access; for example, bandwidth may be monitored/controlled separately for local rack network access (to the other nodes sharing the same top-of-rack switch), remote rack access (to other nodes in the same cluster but on a different rack, which can mean using central switch/network bandwidth), and off-cluster access (to network locations outside the cluster, such as an external database or service).

Distributed filesystem (for example, HDFS) access, which can include a combination of local disk I/O, local rack network, and remote rack network. Depending on the kind of access, distributed filesystem usage can actually take up resources from one or more of the local disk, local rack network, and/or remote rack network. Accordingly, in an embodiment this distributed filesystem resource needs to be monitored and controlled along with direct access to these underlying resources.

Usage of other cluster resources, such as access to the hadoop name node, and the like.

Usage of off-cluster resources, such as load on an external database, ETL tool, web service, and the like.

In an embodiment, the resource monitoring and allocation systems can be configured to work in conjunction with the software middleware of a computer cluster. For example, the software middleware of the computer cluster can be configured to operate normally by receiving jobs from a user, analyzing the received job, dividing the received job into sub-jobs, and distributing the sub-jobs across various slave nodes in the cluster for processing. The resource monitoring and allocation system can complement the activities of the software middleware by monitoring the jobs and/or sub-jobs being processed on various slave nodes in the cluster.

By monitoring the resource utilization of particular jobs and sub-jobs on various slave nodes, the resource monitoring and allocation system can be configured to dynamically reallocate resources on particular slave nodes to particular sub-jobs being processed. The reallocation of resources to particular sub-jobs being processed on particular nodes can allow the computer cluster to operate more efficiently. For example, the resource monitoring and allocation system can be configured to reallocate additional network capacity to high priority sub-jobs in order for the high priority job to be completed on time. By reallocating network capacity to high priority sub-jobs, the resource monitoring and allocation system can be configured to slow down the processing of non-high priority sub-jobs by reducing the amount of network capacity dedicated to the non-priority sub-jobs.

In an embodiment, the resource monitoring and allocation system can comprise a supervisor controller system that is configured to monitor the overall jobs and/or sub-jobs that were initially processed by the software middleware for assignment and processing by the various slave nodes. For example, the supervisor controller can be configured to determine what resources are being utilized by particular sub-jobs operating on particular slave nodes. Further, the supervisor controller can be configured to determine the overall progress in completing an overall job that has been divided into a plurality of sub-jobs being processed by a plurality of slave nodes. By determining the overall progress for completing a particular job, the supervisor controller can ensure that the overall job is completed to the specifications and/or requirements set forth by a client and/or user. In order to determine the particular resource utilization of certain sub-jobs, the resource monitoring and allocation system can comprise an agent system.

In an embodiment, the agent system is configured to operate on one or more of the slave nodes in the computer cluster. In an embodiment, the agent system is configured to operate on each of the slave nodes in a computer cluster. In an embodiment, the agent system is configured to operate on a master node. The agent system can be configured to determine the specific resource utilization at a particular node for each of the particular sub-jobs. After determining the resource utilization of a particular sub-job on a particular node, the agent controller system can be configured to transmit the resource utilization data to a supervisor controller system. In an embodiment, the supervisor controller system can be configured to aggregate resource utilization data from a plurality of agent controller systems operating on various nodes in the cluster. The supervisor controller system can be configured to analyze the resource utilization data to determine the status of the cluster and/or how efficiently the cluster is operating. Further, the supervisor controller system can be configured to analyze the resource utilization data to determine whether an overall job is likely to be completed by the specified time goals set forth by a user of the cluster and/or client.

If the supervisor determines that resources should be reallocated for particular jobs being processed on particular nodes, the supervisor controller system can be configured to generate instructions for transmission to the agent controller system. The agent controller system can be configured to analyze the instructions received from the supervisor controller system in order to generate specific instructions for implementing the resource reallocation on the particular node that the agent controller system has control over. Accordingly, the agent controller system can serve various roles.

In an embodiment, the agent controller system is configured to monitor resource utilization on a particular node and to determine how each sub-job being processed on the particular node is utilizing resources of the particular node. The agent controller system is also responsible for transmitting and/or reporting the resource utilization data to the supervisor controller system. In an embodiment, the agent controller system is also responsible for implementing or enforcing the resource reallocation instructions received from a supervisor controller system. The agent controller system can also be configured to control the allocation of resources to particular jobs and/or sub-jobs that are being processed on a particular node. Further, the agent controller system can be configured to independently decide whether to reallocate resources of the particular computer node without receiving instructions from the supervisor controller system.

The resources of the node that are being utilized by the system to complete the jobs and/or sub-jobs include but are not limited to RAM, CPU capacity, network capacity, and disk I/O capacity. For example, an agent system can be configured to operate on a particular slave node that is processing a particular sub-job. The agent system can be configured to determine the amount of CPU capacity, RAM capacity, network capacity, and/or disk I/O capacity that is being utilized by the particular sub-job that is being processed on the particular slave node.

In an embodiment, the system can be configured to obtain the current resource utilization differently depending on the type of resource. For example, the system can be configured to determine CPU capacity by measuring actual CPU time used via a call to the kernel and/or reading files written by the kernel. In an embodiment, the system can be configured to determine RAM capacity by measuring virtual machine statistics and/or kernel statistics. In an embodiment, the system can be configured to determine network capacity by creating a "wrapper" around the code that actually accesses the network, wherein the "wrapper" is configured to report statistics of network usage. Alternatively, the system can be configured to determine network capacity by using a virtual network interface to intermediate requests to the network, and/or using a "traffic control" command of the kernel or similar kernel-level mechanism to adjust network usage. In an embodiment, the system can be configured to determine disk I/O by measuring one or more of the following: creating a "wrapper" around the code that actually accesses the disk I/O capacity in order to report statistics, and/or using kernel-level controls to adjust disk I/O usage.

In an embodiment, the agent system can be configured to transmit the resource utilization data for the particular slave node to the supervisor system. In an embodiment, the supervisor system and/or the agent system can be configured to determine whether a reallocation of resources should occur at the particular slave node in order to delay or accelerate the processing of the particular sub-job that is being processed by the particular slave node. For example, the supervisor system can be configured to analyze the resource utilization of the particular sub-job that is being processed by a particular slave node and compare the processing performance to other sub-jobs of the same overall job being processed by other slave nodes operating within the computer cluster.

In an embodiment, the supervisor system can be configured to reallocate additional CPU capacity to the selected sub-job in order to allow the particular sub-job to be completed within about the same timeframe as other sub-jobs that are being processed by other slave nodes in the computer cluster. By adding the additional CPU capacity to the particular sub-job, the computer cluster can be configured to prevent the particular sub-job from being a bottleneck in the completion of the overall job. By removing the bottleneck, the computer cluster system can be configured to complete the overall job within a user specified time period.

In an embodiment, the agent controller system can be configured to determine independently from the supervisor controller whether to reallocate resources to a particular sub-job without receiving input from the supervisor controller system. For example, the agent system can be configured to reallocate additional CPU capacity to a particular sub-job being processed on the particular slave node based on determining that the particular sub-job has a higher priority than other sub-jobs being processed by the particular slave node. By adding additional resource capacity to completing the particular sub-job, the particular slave node can decrease the amount of processing time necessary to complete the high priority sub-job. The foregoing examples can also be applied to other resource types, such as but not limited to RAM capacity, network capacity, disk I/O capacity, and the like.

The supervisor controller system and/or the agent controller system can be configured to control the allocation of resources on a particular node through a variety of methods. For example, the agent controller system can be configured to control the amount of RAM usage by a particular sub-job on a particular node by invoking the kill command in an operating system. The kill command is a function that is provided for in a number of commercially available operating systems. The kill command can be configured to send signals to a running process or processes to request the termination of the process. In an embodiment, the agent controller system can be configured to reduce the amount of RAM utilized by a particular sub-job by sending a kill command to the sub-job thereby eliminating the sub-job's use of any RAM resources in the node.

Alternatively, the agent controller system can be configured to invoke the JVM (Java Virtual Machine) garbage collection command or other garbage collection command in order to control the RAM usage for a particular sub-job. The JVM garbage collection command or other garbage collection command are generally a form of automatic memory management that can be provided for in computer languages, such as Java, C, C++, and the like. In general, garbage collection commands operate by finding data objects in a program that are no longer in use and by reclaiming the resources used by the data objects no longer in use, the garbage collection commands can reduce the amount of RAM usage on a node. In an embodiment, the agent controller system can be configured to control RAM utilization by a particular sub-job by using the garbage collection command to reduce the amount of RAM and/or to recover RAM resources not utilized by the particular sub-job.

In an embodiment, the agent controller system can be configured to control RAM usage for a particular sub-job by adjusting a maximum RAM usage limit function in a virtual machine and/or kernel, and/or by adjusting the number of tasks/processes allowed to run on the node through the virtual machine or kernel. In an embodiment, the agent controller system can set the maximum RAM limit for a particular sub-job based on the history of similar sub-jobs. For example, if similar sub-jobs have used no more than 500 megabytes of RAM in past runs, the maximum RAM limit for a sub-job can be set to 500 megabytes, instead of a higher default maximum that is used for sub-jobs in general.

The ability to control RAM is different from the ability to control CPU usage, network usage, and disk I/O usage. For example, an agent controller system can be configured to slow down or delay a job and/or process in order to reduce or increase the use of network utilization, CPU utilization, and/or disk I/O utilization. However, with respect to RAM, if a program and/or process requires a certain amount of RAM in order to process a sub-job, the agent controller cannot generally negotiate with the process in order to reduce the RAM utilization because the required RAM resources are either provided to the sub-job or the sub-job dies. Accordingly, the agent controller system can be configured to either kill a particular sub-job in order to eliminate the RAM utilization by a particular sub-job, or the agent controller system can be configured to use the garbage collection functionality in order to recapture unused RAM by the process or the sub-job.

In an embodiment, the agent controller system can be configured to control the amount of network usage utilized by a particular sub-job on a particular node. The agent controller system can be configured to utilize the sleep command in order to reduce the network utilization by a particular sub-job. The sleep command is provided for in operating systems that are commercially available. The sleep command enables a process or program to be suspended or delayed for a specific period of time before the process or program is allowed to execute on the computer node and/or utilize specific resources on the node.

In an embodiment, the agent controller system can be configured to control the network utilization by invoking the sleep command. The sleep command will force the sub-job to suspend operations and/or processing, which will in turn suspend and/or delay the network utilization by the particular sub-job. In an embodiment, the supervisor controller and/or the agent controller can be configured to generate and/or insert code into a sub-job and/or job wherein the code can invoke a sleep call based on instructions from the supervisor controller and/or the agent controller. Alternatively, the agent controller system can be configured to reduce the network utilization of a sub-job by controlling and/or reducing the bandwidth usage or the amount of bandwidth made available to a sub-job. In an embodiment, the agent controller system can be configured to utilize a traffic shaping utility for controlling the bandwidth that is made available to the particular sub-job. In an embodiment, the system can be configured to control network capacity by creating a "wrapper" around the code that actually accesses the network, wherein the "wrapper" is configured to control network usage by the code.

Generally, network utilization is a challenging resource to manage. For example, network utilization not only depends upon the amount of network being utilized by a particular sub-job or process, but rather network utilization also depends upon the amount of network utilization that is being used by other sub-jobs and/or processes operating on other parts of the cluster. For example, if a particular first job operating on a first node is utilizing 60% of the network bandwidth that is available for accessing the internet, then a second job being processed by a second node may only have access to the remaining 40% of the network bandwidth for connecting to the internet.

The second sub-job operating on the second node can only have access to 40% of the network bandwidth notwithstanding the fact that the second job can have 100% access to the local area network from the second node where there are no additional jobs that are being processed on the second node. Accordingly, in order to monitor and allocate network resources, the supervisor controller can be configured to receive resource utilization data from a plurality of agent controller systems in order to determine an aggregate view of network utilization across the cluster. The global knowledge of network utilization can enable the supervisor controller to determine which sub-jobs across the cluster should be reduced in order to ensure that a particular sub-job has sufficient network resources available in order to complete the sub-job.

In an embodiment, the agent controller system can be configured to control the amount of CPU usage by a particular sub-job on a particular node. In an embodiment, the agent controller system can be configured to utilize the nice functionality provided for in an operating system. The nice functionality is generally provided for in commercially available operating systems. The nice command can enable a process and/or sub-job to have more or less CPU time than other processes or sub-jobs running on the node. The nice command can allow for assigning different processes and/or sub-jobs with a priority level, and based on the priority level that has been assigned to the process and/or sub-job, the CPU can provide more or less processing time to the particular process or sub-job. In an embodiment, the agent controller system can be configured to reduce the CPU usage of a particular sub-job by assigning the sub-job a low priority level using the nice command. Alternatively, the agent controller system can be configured to reduce the CPU usage of a sub-job through the use of cgroups. Generally, cgroups (also known as control groups) provide a mechanism for aggregating and partitioning sets of processes and the future children of the processes into a group having limits on resource utilization. In an embodiment, the agent controller system can be configured to utilize cgroups in order to place limits on the CPU utilization for a particular sub-job that is being processed by a particular node. Alternatively, the agent controller system can be configured to reduce the CPU usage of a sub-job through the use of posix priorities, a scheduler option built into most operating systems, including linux. In an embodiment, the agent controller system can be configured to utilize posix priorities in order to place limits on the CPU utilization for a particular sub-job that is being processed by a particular node. In an embodiment, the system can be configured to control CPU usage by using other kernel mechanisms that are similar to the nice command, cgroups, and posix priorities described above.

The agent controller system can be configured to control the amount of disk I/O usage by a particular sub-job that is being processed on a particular node. In an embodiment, the agent controller system can be configured to use at least one of the nice command, cgroups, posix priorities, or the sleep command in order to reduce the disk I/O usage of a particular sub-job that is being processed by a particular node. In an embodiment, the system can be configured to control disk I/O by controlling one or more of the following: creating a "wrapper" around the code that actually accesses the disk I/O capacity in order to control access to the disk I/O capacity, and/or using kernel-level controls to adjust disk I/O usage.

In an embodiment, the system can be configured to control the usage of specific resources, for example, the usage of CPU, RAM, network, and disk I/O, by controlling the resource through the use of a kernel extension added to the computer operating system, for example a loadable kernel module that is dynamically loaded by the operating system kernel.

In an embodiment, the supervisor controller system can also be configured to control the assignment of sub-jobs to particular nodes on the cluster in order to use resources more efficiently. For example, the supervisor controller system may determine that a given slave node is running primarily sub-jobs that use CPU intensively but do not use RAM or disk I/O intensively, and determine that the given slave node should be assigned additional sub-jobs that require heavy use of RAM or disk I/O but do not require heavy use of CPU.

The various foregoing embodiments of the resource monitoring and allocation system can be implemented and/or utilized in a variety of computer cluster environments. For example, the resource monitoring and allocation system can be implemented in conjunction with a hadoop cluster system. In an embodiment, the resource monitoring and allocation system can be implemented in conjunction with non-hadoop clusters, such as other types of computer clusters configured to operate a variety of software applications. Software applications include but are not limited to web servers, databases (for example, MySQL or Impala), virtual machines, and the like. In an embodiment, the resource monitoring and allocation system can be implemented with other non-hadoop clusters, such as network appliances.

In some versions of the hadoop implementation, the resource monitoring and allocation system can be configured to operate in conjunction with the job tracker and the task tracker systems. In an embodiment, the job tracker of the hadoop system divides a new job into a plurality of tasks. The job tracker can be configured to determine the number of available slots or containers in the cluster or in particular nodes to process the various generated tasks. The job tracker can be configured to assign the tasks to various nodes based on the number of slots or containers available at a particular node. In an embodiment, the task tracker of the hadoop system can be configured to transmit to the job tracker the number of available slots or containers for processing various tasks on a particular node. The supervisor controller or the resource monitoring and allocation system can be configured to communicate with one or more agent controllers operating on the various nodes of the cluster. The agent controllers can be configured to communicate with the supervisor controller in order to transmit resource utilization data to the supervisor controller. The resource utilization data can include information about how individual tasks are utilizing various resources (for example, CPU, RAM, disk I/O, network) of the node. In an embodiment, the supervisor controller system and/or the agent controller system can be configured to determine whether a particular task should receive more or less or the same amount of system resources available at the node that is processing the particular task.

In the context of implementing the resource monitoring and allocation system in conjunction with a non-hadoop cluster, the tasks in a hadoop system are substituted with software applications and other processes. For example, software applications can include but are not limited to web servers, databases, virtual machines, and the like. In such implementations, the agent controller systems can be configured to operate on nodes of a cluster and can be configured to monitor the resource utilization of each software application operating on the node. For example, the agent controller system can be configured to determine the CPU usage, RAM utilization, network usage, and disk I/O usage of a web server operating on the node.

The agent controller system can be configured to transmit this resource utilization data to a supervisor controller system. The supervisor controller system can be configured to analyze the resource utilization data from a plurality of nodes in the cluster to determine whether resource reallocation is necessary to allow the cluster to operate more efficiently. The supervisor controller system can be configured to transmit resource reallocation instructions to specific agent controller systems operating on particular nodes. The instructions can comprise data necessary for the agent controller system to generate instructions and/or commands to increase and/or reduce the resource utilization of a particular software application or other processes that are operating on the node.

In implementations where the resource monitoring and allocation system is implemented in a network appliance, such as a network router and/or switch or the like, an agent controller system can be implemented in the network appliance. In an embodiment, the agent controller system can be configured to interrogate the network appliance in order to determine the resource utilization of particular jobs that are being processed by the network appliance. For example, an agent controller system operating on a router and/or switch can be configured to analyze data packets that are coming into the router and/or switch. In an embodiment, the agent controller system can be configured to communicate with a supervisor controller system in order to determine which ports of the router and/or switch through which more data or less data should be processed.

There are many challenges in implementing the resource monitoring and allocation system. Accordingly, one of ordinary skill in the art will appreciate that the systems, methods, and devices disclosed herein for implementing the resource monitoring and allocation system are novel, unique, and are nonobvious in view of the numerous challenges in implementing such a system. A challenge in implementing the system is the automatic tuning of the allocation of resources to various jobs and sub-jobs being processed by plurality of nodes across a cluster. In an embodiment, the automatic tuning of resource allocations in a cluster is based on desired outcomes inputted into system by the user. For example, a user can define an outcome that is time based. The user can specify that the project needs to be completed by a certain period of time on a particular day.

Alternatively, the automatic tuning can be based on a desired resource allocation as defined by the user. For example, a user of the cluster may define that a particular job must have 75% of the cluster's network bandwidth capacity as well as 80% of the CPU utilization at a particular node in the cluster. As another example, a user of the cluster may define that a particular job must have access to specifically defined resource minimums, for example at least 100 megabits per second of network bandwidth, 300 megabytes per second of disk I/O, and 1 billion CPU instructions per second.

The existence of an outcome requirement set by the user can require the resource monitoring and allocation system to have access to global knowledge of the cluster in order to properly monitor and control the various nodes such that the user defined outcomes can be achieved. For example, the resource monitoring and allocation system must globally determine and globally control the network usage of each node in the cluster in order to ensure that 75% of the network bandwidth capacity is dedicated to the particular job or sub-job designated by the user. This can require that the resource monitoring and allocation system reduce the network utilization of certain jobs or sub-jobs operating on other nodes of the cluster in order to provide excess network bandwidth to the particular job or sub-jobs that the user required to have 75% of the network bandwidth of the cluster.

In an embodiment, the resource monitoring and allocation system can be configured to identify jobs or sub-jobs that have been allocated a certain amount of computer resources but is only utilizing small portion of the resource allocation. By identifying such jobs or sub-jobs, the system can be configured to re-allocate a portion of the resource allocation to another job or sub-job. For example, the system can be configured to identify a first sub-job that is being processed by a first node, wherein the first sub-job has been allocated 75% of the network resource capacity but is only utilizing 25% of the network resource capacity. The system can be configured to reallocate a portion of the network resource capacity from the first sub-job to a second sub-job that is being processed on the first node or another node. Further, the system can be configured to reallocate the portion of the network resource capacity from the second sub-job back to the first sub-job if the system identifies that the performance of the first sub-job declines due to a lack of network resource capacity.

Determining the available resources across a computer cluster can be challenging because the status of the cluster is continuously changing. Therefore, the resource monitoring and allocation system requires continuous updated information regarding the resource utilization at each node in the cluster. As the information about the status of the various nodes in the cluster changes the resource monitoring and allocation system can be configured to adapt accordingly. Another challenge of the resource monitoring and allocation system is the managing, processing, analyzing, and logging of the large amount of data transmitted to the supervisor controller from the plurality of agent controllers operating in the various nodes of the cluster. In an embodiment, the resource monitoring and allocation system can be configured to receive resource allocation data from each node in the cluster once every 1 second to 5 seconds. The sheer volume of data coming into the monitoring and allocation system makes it impossible for a human being, whether entirely in the person's mind or whether the person is using a pen and paper, to track and/or perform, in real-time or substantially real-time, the activities of the embodiments of the resource management and allocation systems that are disclosed herein.

FIG. 1 is an embodiment of a schematic diagram illustrating a computer cluster. In an embodiment, the computer cluster 101 can comprise a master node 104 connected to a network 108. The computer cluster 101 can also comprise a plurality of nodes 110, 120, 130 that are connected to each other and to the master node 104 through network 108. In an embodiment, the cluster 101 can be configured to communicate with client 102. The master node 104 can be configured to receive from the client 102 jobs for processing on the cluster 101. In an embodiment, the master node 104 can be configured to return to the client 102 completed jobs that have been processed by the cluster 101.

The master node 104 can be configured to analyze jobs received from the client 102. The master node 104 can be configured to divide the job received from the client 102 into a plurality of smaller jobs or sub-jobs. The master node 104 can be configured to distribute and/or assign the smaller jobs or sub-jobs to various nodes 110, 120, 130 in the cluster 101. In assigning the smaller sub-jobs to the various nodes 110, 120, 130, the master node 104 may be configured to utilize management software 106 for managing and/or tracking the smaller jobs that have been distributed across the cluster 101.

In an embodiment, the management software 106 is implemented using a hadoop system. In a hadoop system, the management software 106 can comprise software known as job tracker. Alternatively, the management software 106 can be implemented using the Yarn software or Yarn resource manager and/or Yarn node manage in a hadoop system. In non-hadoop systems, the management software 106 can comprise other software applications that are configured to analyze jobs, divide jobs into smaller sub-jobs, and/or distribute the sub-jobs to various nodes in the cluster 101 for processing.

In an embodiment, the slave nodes 110, 120, 130 can comprise software 112, 122, 132 for tracking the sub-jobs that are being processed on the node. In an embodiment, the nodes 110, 120, 130 can comprise a storage device 118, 128, 138 configured to store data and/or software for processing the sub-jobs received from the master node 104. In an embodiment, the software 112, 122, 132 is configured to track sub-jobs 114, 116, 124, 126, 134, 136 that have been received from the master node 104 for further processing on the node. In an embodiment, the software 112, 122, 132 can be configured to communicate with the storage devices 118, 128, 138 in order to process the sub-jobs.

FIG. 2 is an embodiment of a schematic diagram illustrating a computer cluster comprising an embodiment of a dynamic monitoring and/or resource allocation system. In an embodiment, a cluster 201 can be configured to communicate with a client 202. The client can be configured to send a job for processing on the cluster 201. The cluster 201 can be configured to return a completed job to the client 202. In an embodiment, the cluster 201 can comprise a master node 204 as well as a plurality of slave nodes 210, 232. The master node 204 can be configured to analyze the job received from client 202. The master node 204 can comprise software 206 for analyzing the job, dividing the job into sub-jobs, and/or distributing the sub-jobs to the various slave nodes in the cluster 201. In a hadoop system, the software 206 can comprise the job tracker software or the Yarn software. In non-hadoop systems, the software 206 can comprise other management software for analyzing jobs, dividing jobs into sub-jobs, and/or distributing sub-jobs across the cluster to various nodes.

In an embodiment, the software 206 can be configured to divide the job into four sub-jobs 212, 214, 228, 230. In a hadoop system, the sub-jobs are known as tasks. In non-hadoop systems, the smaller jobs that are generated by the master node 204 are generically known as sub-jobs. As illustrated in FIG. 2, the management software 206 can be configured to distribute sub-jobs 214 to a first node 210 and can be configured to distribute sub-jobs 228, 230 to a second node 232.

In an embodiment, the slave nodes 210, 232 can comprise software 216, 234 for tracking sub-jobs that have been assigned to a particular node. In a hadoop system, the software 216, 234 can comprise the task tracker software. In non-hadoop systems, the software 216, 234 can comprise other node manager software for tracking the sub-jobs that have been assigned to a particular node from a master node 204.

In an embodiment, the master node can comprise a supervisor controller 208. The supervisor controller 208 can be configured to monitor, track, log, and/or control the allocation of computer resources at particular nodes 210, 232. In an embodiment, the nodes 210, 232 can comprise an agent controller 218, 236. The agent controller 218, 236 can be configured to monitor, track, log and/or control the allocation of computer resources on a particular node. For example, the agent controller 218 can be configured to communicate with the kernel of the node or other systems on the node 220 to determine the computer resources being utilized by the sub-jobs 222, 224 that are operating on node 210.

In determining the resource utilization of particular sub-jobs operating on a node, the agent controller 218, 236 can be configured to transmit the resource utilization data to the supervisor controller 208. In an embodiment, the supervisor controller 208 can be configured to analyze the resource utilization data received from the agent controller 218, 232 in order to determine whether computer resources that are currently being utilized by certain sub-jobs should be reallocated to other sub-jobs. Based on the foregoing determination, the supervisor controller 208 can be configured to generate instructions for transmission to the agent controller 218, 236. The instructions can be configured to cause the agent controller 218, 236 to generate further commands to control the allocation of resources on a particular node 210, 232 for use by various sub-jobs 222, 224, 240, 242.

In an embodiment, the agent controller 218, 236 can be configured to generate commands for controlling the allocation of resources on a particular node without receiving instructions from a supervisor controller 208. For example, an agent controller 218, 236 can be configured to increase and/or decrease CPU capacity directed to a particular sub-job 222, 224, 240, 242 based on the prioritization of the sub-task. In an embodiment, the agent controller 218 can be configured to determine that the sub-job 222 has a higher priority than that of sub-job 224. Based on the foregoing determination, the agent controller 218 can be configured to increase the CPU capacity directed to sub-job 222 while decreasing the CPU capacity for sub-job 224. In an embodiment, the foregoing reallocation of computer resources can be performed by the agent controller 218 without instructions from the supervisor controller 208.

FIG. 2A is an embodiment of a schematic diagram illustrating a computer cluster comprising an embodiment of a dynamic monitoring and/or resource allocation system. Similar to FIG. 2, a client 202 can submit jobs for processing on cluster 201a. In an embodiment, cluster 201a can comprise a master node 204 and a slave node 246. In contrast to FIG. 2, the cluster 201a as illustrated in FIG. 2A can comprise a supervisor controller 208 that operates on node 246 while a job tracker or other management software 206 operates on master node 204.

The advantage of separating the job tracker or other management software 206 from the supervisor controller 208 is to ensure that the job tracker or other management software 206 has sufficient computer resources on the master node for processing the job submissions received from client 202. Similarly, by positioning the supervisor controller 208 on a separate node 246, the operator of the cluster 201a can ensure that the supervisor controller has sufficient computer resources dedicated to the supervisor controller 208 such that the supervisor controller 208 can continuously monitor, process, and/or analyze all of the resource data that is being received form the plurality of agent controllers 218, 236.

Additionally, by positioning the supervisor controller 208 on a separate node 246, the operator of the cluster 201a can ensure that the supervisor controller 208 has sufficient computer resources for dynamically and automatically generating instructions for controlling in real time or substantially real time the allocation of resources on a particular node for a particular task operating on the node.

FIG. 2B is an embodiment of a schematic diagram illustrating a computer cluster comprising an embodiment of a dynamic monitoring and/or resource allocation system. Similar to FIGS. 2 and 2A, a client 202 can submit jobs for processing on cluster 201b. In contrast to FIGS. 2 and 2A, the cluster 201b as illustrated in FIG. 2B can comprise a first supervisor controller 208 that operates on node 246 and a second supervisor controller 209 that operates on node 254. As illustrated in FIG. 2B, the job tracker or other management software 206 is positioned on master node 204.

The advantage of this configuration is the ability to ensure that the necessary computer resources are being allocated to the supervisor controller systems 208, 209 and the job tracker or other management software 206. In an embodiment, the first supervisor controller 208 and the second supervisor controller 209 can be configured to communicate with different agent controllers 218 and 236. For example, the first supervisor controller 208 can be configured to communicate with agent controller 218 while the second supervisor controller 209 can be configured to communicate with agent controller 236. In an embodiment, the agent controllers 218 and 236 communicate only with predesignated supervisor controllers 208, 209. For example, the agent controller 218 can be configured to only communicate with supervisor controller 208 while the agent controller 236 can be configured to only communicate with supervisor controller 209.

In an embodiment, the agent controllers 218, 236 can be configured to communicate with the supervisor controllers 208, 209 on a first come, first served basis. For example, the agent controller 218 can be configured to communicate with either the first supervisor controller 208 or the second supervisor controller 209 depending upon which supervisor controller is available at any particular time. Similarly, the agent controller 236 can be configured to communicate with either the first supervisor controller 208 or the second supervisor controller 209 depending upon which supervisor controller is available at any one particular time.

The advantage of comprising two or more supervisor controllers in a cluster system is to ensure that the supervisor controllers have sufficient computer resources to continuously monitor, track, analyze, log, and/or control the allocation of computer resources on a particular node for any particular sub-job operating on a node. In an embodiment, the two or more supervisor controllers 208, 209 can be configured to communicate with each other in order to share tracking information related to the allocation of computer resources across various nodes in the cluster. The two or more supervisor controllers 208, 209 can be configured to communicate with each other in order to coordinate the control of the allocation of computer resources at particular nodes in the cluster.

FIG. 3 is a flow chart depicting an embodiment of a process for dynamically monitoring and/or allocating resources across a computer cluster. In an embodiment, the process can start at block 302 with a client submitting a job or other submission to the hadoop system. At block 304, the job tracker of the hadoop system can be configured to receive the submission from the client. At block 306, the job tracker can be configured to invoke the map reduce function in the hadoop system to use map process in order to divide the submission into various tasks. At block 306, the job tracker can be configured to invoke the map reduce function of the hadoop system in order to assign the task to various slave nodes in the cluster.

At block 308, the slave nodes are configured to receive the assigned task from the job tracker. In an embodiment, the slave node comprises a task tracker that is configured to receive the task from the job tracker. At block 310, the slave node can be configured to process the task received from the job tracker. At block 312, the task tracker can be configured to determine if the task has terminated or failed during the processing by the node. If the task has terminated or failed, at block 314, the slave node informs the job tracker. At block 314, the job tracker reassigns the terminated or failed task to another slave node and returns to block 308. If at decision block 312, the task has not terminated, the system moves to block 316.

At block 316, the agent controller that is operating on the node periodically or continuously accesses or interrogates the slave node to obtain computer resource data from the kernel or other modules. In an embodiment, the agent controller at block 316 can be configured to track the task in the slave node. At block 320, the agent controller can be configured to transmit the computer resource status data to the supervisor controller. While the node is processing the task that has been assigned to the node at block 310, the agent and supervisor controllers can be configured to track the assigned task at block 318.

At block 322, the agent and/or supervisor controllers periodically or in real time determine whether the computer resources that are being allocated to each task at each particular node should be changed. In an embodiment, the system can be configured at block 324 to generate instructions for the slave node to dynamically change the allocation of resources being utilized by particular jobs on a particular node if the agent and/or supervisor controllers determine that the computer resource allocation is above a threshold level for a particular task operating on a particular node. For example, the agent and/or supervisor controllers can be configured to determine that a particular job is utilizing RAM that exceeds a threshold limit or level for a particular node. In response, the agent and/or the supervisor controllers can be configured to instruct the node to terminate the job if the job is utilizing RAM that exceeds a threshold limit or level for a particular node.

At block 312, the task tracker can be configured to determine that the task has been terminated and inform the job tracker at block 314. At block 314, the job tracker can be configured to reassign the terminated task to another slave node. In an embodiment, the supervisor can be configured to use the historical data relating to the previous termination of the job in order to instruct the job tracker to assign the previously terminated task to a node having enough RAM capacity to allocate to the job, thereby preventing the job from being terminated again. Alternatively, the supervisor controller can be configured to directly assign the previously terminated task to a node having enough RAM capacity to allocate to the job, thereby avoiding the need for the job tracker to assign the task to a new node.

If the agent and/or supervisor controllers determine that the job is operating within an acceptable range or is below a particular threshold level, then the system can be configured to return the block 312 to determine if the task has died or terminated. If the process has not been terminated the system continues to block 316 to periodically or continuously access the computer resource status data on a particular node.

FIG. 3A is a flow chart depicting an embodiment of a process for dynamically monitoring and/or allocating resources across a computer cluster. Similar to FIG. 3, the agent controller can be configured to periodically or continuously access the computer resource status data on a particular slave node. At block 320, the agent controller can be configured to transmit the computer resource status data to the supervisor controller. While the slave node processes the task at block 310, the agent and/or supervisor controller at block 326 can be configured to track the task on a particular node and determine the priority of the task based on client input when the job was submitted to the job tracker.

At block 328, the agent and/or supervisor controllers periodically or in real time determine the resources to be allocated to each task on a slave node based optionally on the prioritization of the task as determined by the client or based optionally on whether the job performance is below a minimum performance guarantee specified by the client. At block 324, the system can be configured to determine if a resource allocation is above a threshold level for a particular task and/or node or if a job is operating below a designated priority level or if the job performance is below a minimum performance guarantee, then the system can be configured to generate instructions for the slave node to dynamically change the allocation of computer resources to be dedicated to the job in order to bring down the resource allocation below a threshold level, or to ensure that the job is operating at a specific priority level or to ensure that the job performance is above a minimum performance guarantee.

Figure 4:
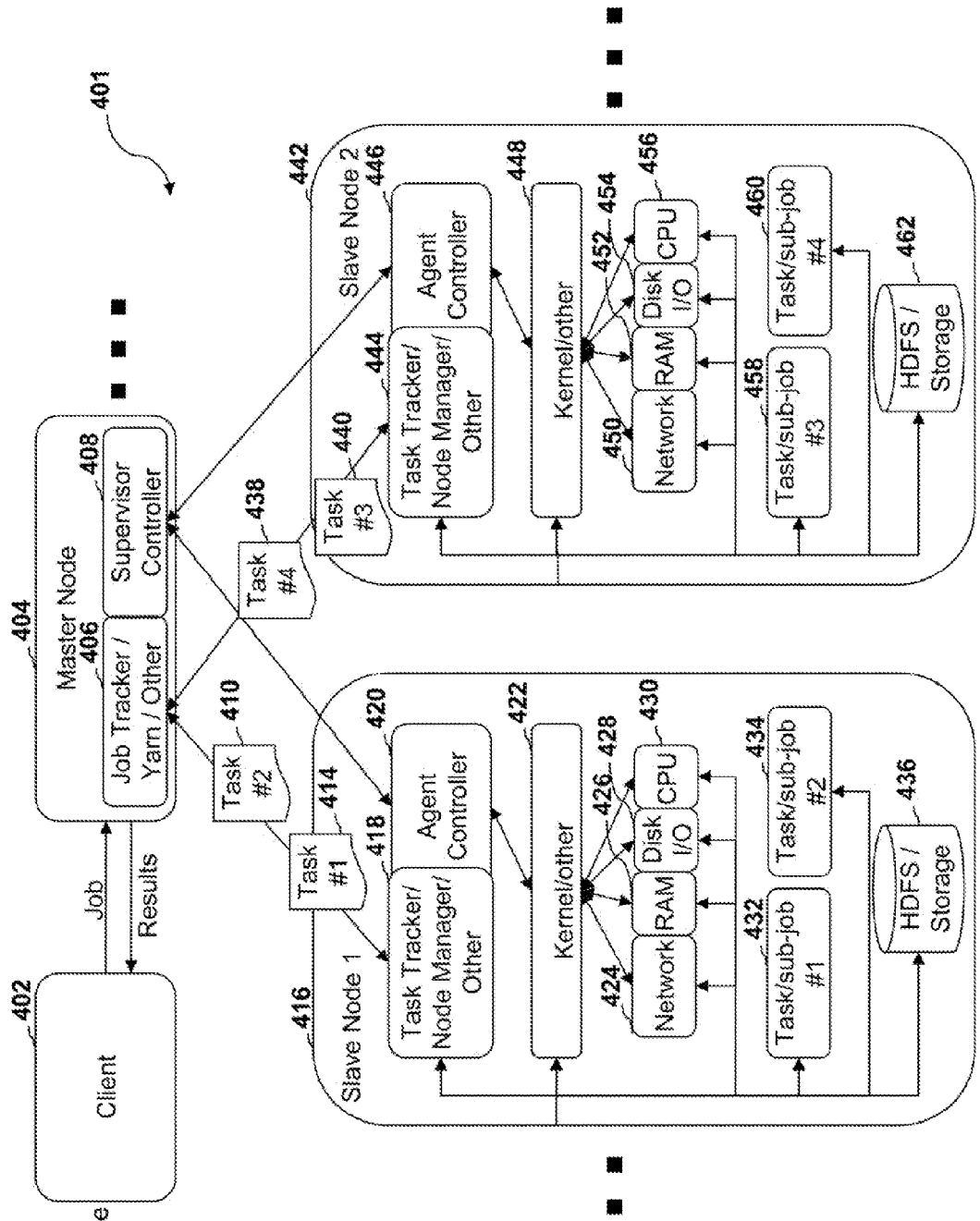
FIG. 4 is an embodiment of a schematic diagram illustrating a computer cluster comprising an embodiment of a dynamic monitoring and/or resource allocation system.

FIG. 4 is an embodiment of a schematic diagram illustrating a computer cluster comprising an embodiment of a dynamic monitoring and/or resource allocation system. Similar to FIGS. 2, 2A, 2B, a client 402 can communicate with one or more master nodes or other nodes 404 in order to submit a job for processing on a computer cluster 401. In an embodiment, the master node 404 can comprise a management software 406 and a supervisor controller 408. In an embodiment, the supervisor controller 408 and the management software 406 operate on a single master node 404. In an embodiment, the supervisor controller 408 and the management software 406 operate on separate master nodes 404. In an embodiment, the job that is submitted by client 402 is received by the management software 406 that is responsible for analyzing the job and dividing the job into smaller sub-jobs. As illustrated in FIG. 4, the system can be implemented in conjunction with a hadoop system; however, one of ordinary skill in the art will appreciate that the systems and methods disclosed herein can be used in conjunction with other cluster systems and not just with hadoop systems.

The divided sub-jobs 414, 410, 438, 440 can be assigned by the management software 406 to various nodes 416, 442 in the cluster. In an embodiment, a node manager (or a task tracker in a hadoop system) 418, 444 can be configured to receive the sub-jobs that have been assigned to a particular node by the management software 406. The supervisor controller 408 can be configured to communicate with the agent controllers 420, 446 that operate on the nodes 416, 442 of the cluster. While the nodes 416, 442 are processing the sub-jobs, the node manager 418, 444 can be configured to track the sub-jobs being operated on by particular nodes.

Additionally, the agent controllers 420, 446 can be configured to also track the sub-jobs being operated by the nodes 416, 442 in addition to determining the allocation of computer resources to each of the sub-jobs on a particular node. For example, agent controller 420 can be configured to communicate with the kernel or other module 422 of the node 416 in order to determine the amount of network capacity 424, RAM usage 426, disk I/O usage 428, and CPU capacitor 430 as being utilized by the sub-jobs 432, 434 that are being operated on by the node 416. The agent controller 420 can be configured to transmit the computer resource allocation data to the supervisor controller 408. The agent controller 420 and/or the supervisor controller 408 either alone or in conjunction with each other, can be configured to determine which sub-jobs 432, 434 are utilizing acceptable allocations of computer resources of the node 416. For example, the agent controller 420 can be configured to determine that a first sub-job 432 is utilizing excess disk I/O capacity 428.

In an embodiment, the foregoing determination can be based on the prioritization assigned to the first sub-job 432. If the sub-job 432 has a low prioritization but is utilizing substantially all of the disk I/O capacity 428, the agent controller 420 can be configured to independently reduce the amount of disk I/O capacity 428 that is allocated to the sub-job 432 in order to provide the second sub-job 434 greater access to the disk I/O capacity 428.

In another example, the supervisor controller 408 and the agent controllers 420, 446 can be configured to coordinate with each other in order to collectively determine and/or control the resource allocations that are provided to various sub-jobs operating on the nodes 416, 442. In an embodiment, the supervisor controller 408 can be configured to determine that the third sub-job 458 is utilizing 100% of the network capacity 450 by analyzing the resource data transmitted to the supervisor controller 408 from the agent controller 446.

In an embodiment, the 100% utilization of the network capacity 450 can result in the 100% network capacity utilization for the entire cluster 401. Accordingly, the first sub-job 432 operating on node 416 comprises 0% of the network capacity 424 for node 416 to process the sub-job 432. In an embodiment, the first sub-job 432 comprises a high priority rating whereas the third sub-job 458 comprises a low priority rating. The supervisor controller 408 can be configured to generate instructions for instructing the agent controller 446 to reduce the network capacity 450 that is allocated to the third sub-job 458. The supervisor controller 408 can also be configured to instruct the agent controller 420 to provide additional network capacity 424 to the first sub-job 432.

Figure 5:
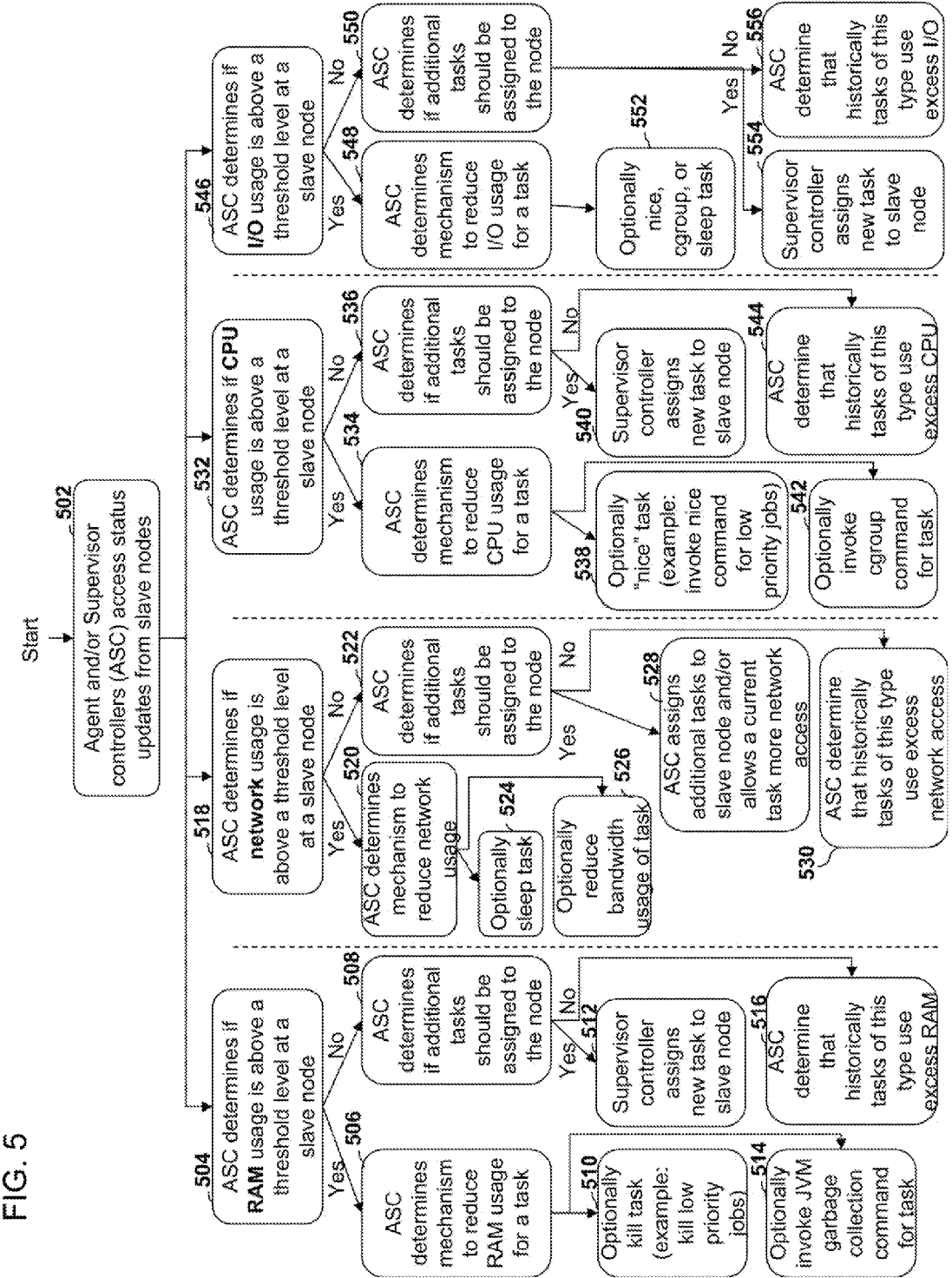
FIG. 5 is a flowchart depicting an embodiment of a process for monitoring and/or allocating cluster resources, such as RAM, network usage, CPU usage, and disk I/O usage.

FIG. 5 is a flow chart depicting an embodiment of a process for monitoring and/or allocating cluster resources, such as RAM, network usage, CPU usage, and disk I/O usage. The process can start at block 502 with the agent and/or supervisor controllers accessing the status updates from the slave nodes. At block 504, the agent and/or supervisor controllers can be configured to determine if the RAM usage is above a threshold level at a particular node for a particular job. If the determination is yes, at block 506, the agent and/or supervisor controllers can be configured to determine a mechanism to reduce the RAM usage for a particular task on a particular node. For example, the agent and/or supervisor controller can be configured to optionally kill a task in order to reduce the RAM usage for a particular task.

In an embodiment, the agent and/or supervisor controllers can be configured to optionally kill low priority sub-jobs in order to free RAM usage for other high priority jobs operating on the same node. The usage of RAM, unlike other computer resources, is difficult to reduce or limit for a particular task. Generally, a job will require a certain amount of RAM to operate and if the job does not receive the required RAM usage, then the job cannot be performed. Accordingly, there is less discretion in controlling RAM usage as compared to controlling network usage, CPU usage, and disk I/O usage. Alternatively, the agent and/or supervisor controllers can be configured to optionally invoke the garbage collection command of an operating system. For example, the agent and/or supervisor controller can be configured to invoke the JAVA virtual machine garbage collection command for a particular task in order to reduce the RAM usage by that task on a particular node.

If at block 504, the agent and/or supervisor controllers determine that the actual RAM usage is below a threshold level at a particular node, the agent and/or supervisor controllers at block 508 can be configured to determine whether additional tasks should be assigned to the node. If the determination is yes, then at block 512, the supervisor controller can be configured to instruct the management software 206 (for example the job tracker in a hadoop system) to assign new tasks to the slave node. Alternatively, at block 512, the supervisor controller can be configured to assign a new task to the slave node without instructing the management software 206. If at block 508 the determination is no, the system at block 516 has determined that historically such tasks of this type use excess RAM.

At block 518, the agent and/or supervisor controllers can be configured to determine if the network usage is above a threshold level at a particular slave node for a particular job. If the determination is yes, at block 520, the agent and/or supervisor controllers can be configured to determine a mechanism for reducing the network usage. For example, the agent and/or supervisor controllers can be configured to optionally sleep a task at block 524. Alternatively, the agent and/or supervisor controllers can be configured to optionally reduce bandwidth usage at block 526.

If the determination at block 518 is no, the agent and/or supervisor controller can be configured to determine if additional tasks should be assigned to the node. If the determination is yes, the agent and/or supervisor controllers can be configured to assign at block 528 additional tasks to the node and/or allow a current task more network access. If the determination is no at block 522, the agent and/or supervisor controllers have made a determination that historically such tasks of this type use excess network capacity and therefore no additional tasks should be assigned to this node.

At block 532, the agent and/or supervisor controllers can be determined if CPU usage is above a threshold level at a particular node for a particular task. If the determination is yes, the agent and/or supervisor controllers can be configured to determine a mechanism to reduce the CPU usage for a particular task. For example, the agent and/or supervisor controllers can be configured to optionally "nice" a task. Alternatively, the agent and/or supervisor controllers can be configured to optionally invoke a Cgroup command for a task in order to reduce the CPU usage for a particular task.

If the determination is no at block 532, then the agent and/or supervisor controllers can be configured to determine if additional tasks should be assigned to the node. If the determination is yes, at block 540 the supervisor controller can be configured to instruct the management software 206 to assign a new sub-job to the slave node. Alternatively, the supervisor controller can be configured to directly assign a new sub-job to the node. If the determination is no at block 536, then at block 544 the agent and/or supervisor controllers have made a determination that historically the job of this type uses excess CPU and therefore no additional sub-jobs should be assigned to this node.

At block 546, the agent and/or supervisor determines if disk I/O usage is above a threshold level at a particular slave node. If the determination is yes, then at block 548 the agent and/or supervisor controllers determine a mechanism to reduce the disk I/O usage for a particular task. For example, the agent and/or supervisor controllers can be configured to optionally nice, Cgroup, or sleep a particular sub-job at block 552. If the determination is no at block 546, the agent and/or supervisor controllers can be configured to determine if additional sub-jobs should be assigned to the node. If the determination is yes, then at block 554 the supervisor controller and/or the management software 206 can be configured to assign a new task to the slave node. If the determination is no at block 550, then at block 556, the agent and/or supervisor controllers have made a determination that historically such sub-jobs of this type use excess disk I/O and therefore no additional sub-jobs should be assigned to this node.

Figure 6:
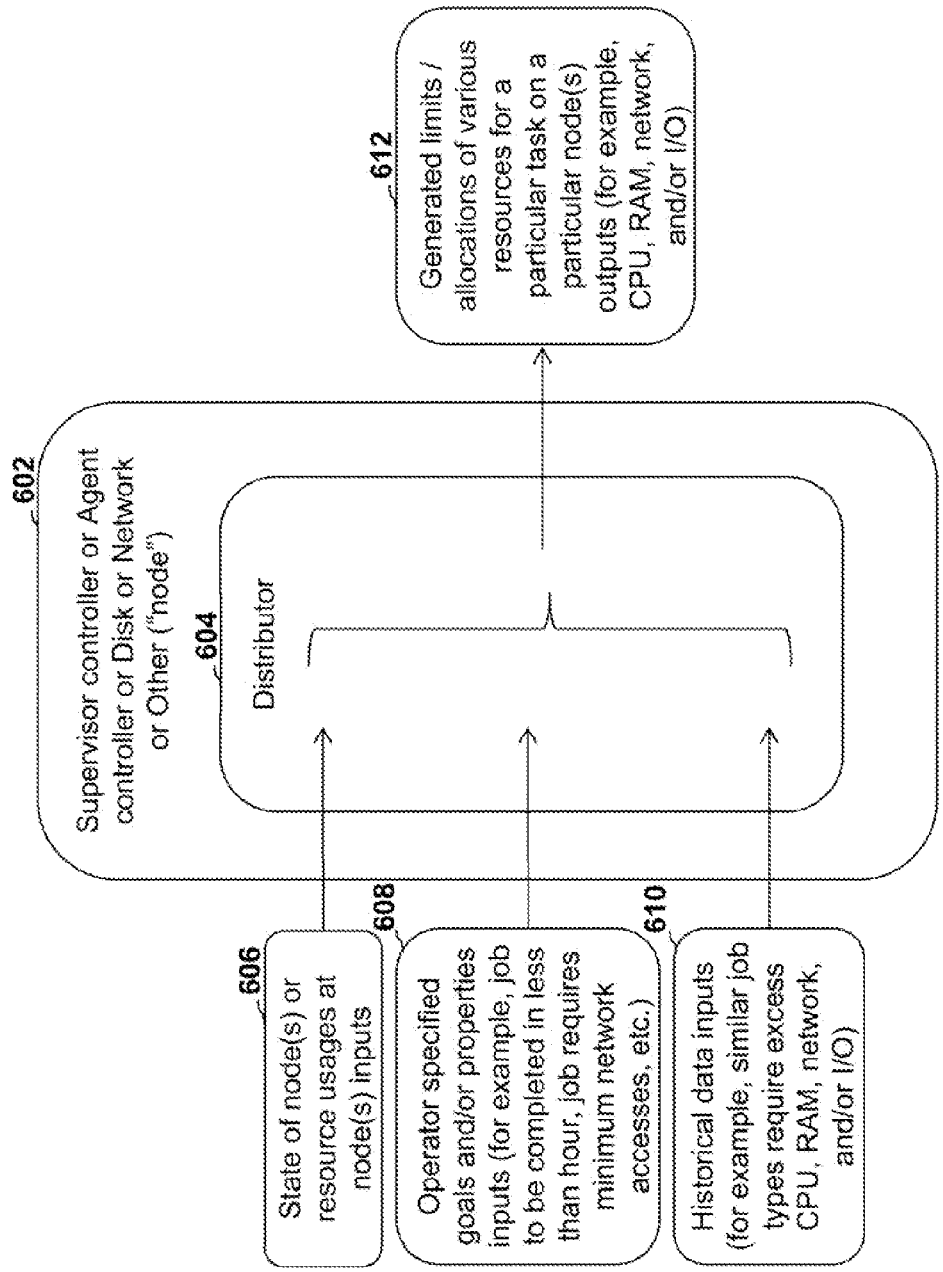
FIG. 6 is a block diagram depicting a high level overview of an embodiment of a distributor system.

FIG. 6 is a block diagram depicting a high-level overview of an embodiment of a distributor system. In an embodiment, a supervisor controller, an agent controller, a disk, a network appliance, or other device 602 that is in a cluster or connected to a cluster can comprise a distributor 604. In an embodiment, a distributor 604 can be configured to receive a variety of inputs in order to determine the resource allocations for a particular task operating on a particular node. In an embodiment, the distributor 604 can be configured to receive data 606 regarding the state of a node and/or the computer resource usages at a particular node.

The distributor 604 can be configured to analyze the data 606 in order to generate limits and/or allocations of various computer resources for a particular task on a particular node. The limits and/or allocations of various computer resources can be generated as outputs 612 by the distributor 604 wherein the output 612 can be utilized by the supervisor controller, agent controller, disk, network appliance, or other device 602 in order to generate instructions for adding or reducing the allocation of computer resources to a particular job or sub-job.

In an embodiment, the distributor 604 can be configured to receive as an input 608 operator specified goals and/or properties for a particular job and/or sub-job. For example, an operator, or client, or other user of a cluster system can specify that a job be completed in a less than a specified period of time or that a job must be provided a minimum level of network access in order to complete the job. In an embodiment, the distributor 604 can be configured to analyze the operator specified inputs in order to generate an output 612 for limiting and/or allocating various computer resources for a particular task operating on a particular node.

In an embodiment, the distributor 604 can be configured to receive historical data inputs. In an embodiment, historical data inputs can include data relating to how similar jobs of this type require specific CPU usages, RAM usages, network usages, and/or disk I/O usages. In an embodiment, the distributor 604 can be configured to analyze the historical data inputs 610 in order to generate outputs 612 relating to limitations and/or allocations of various computer resources for particular jobs or sub-jobs on particular nodes.

Figure 7:
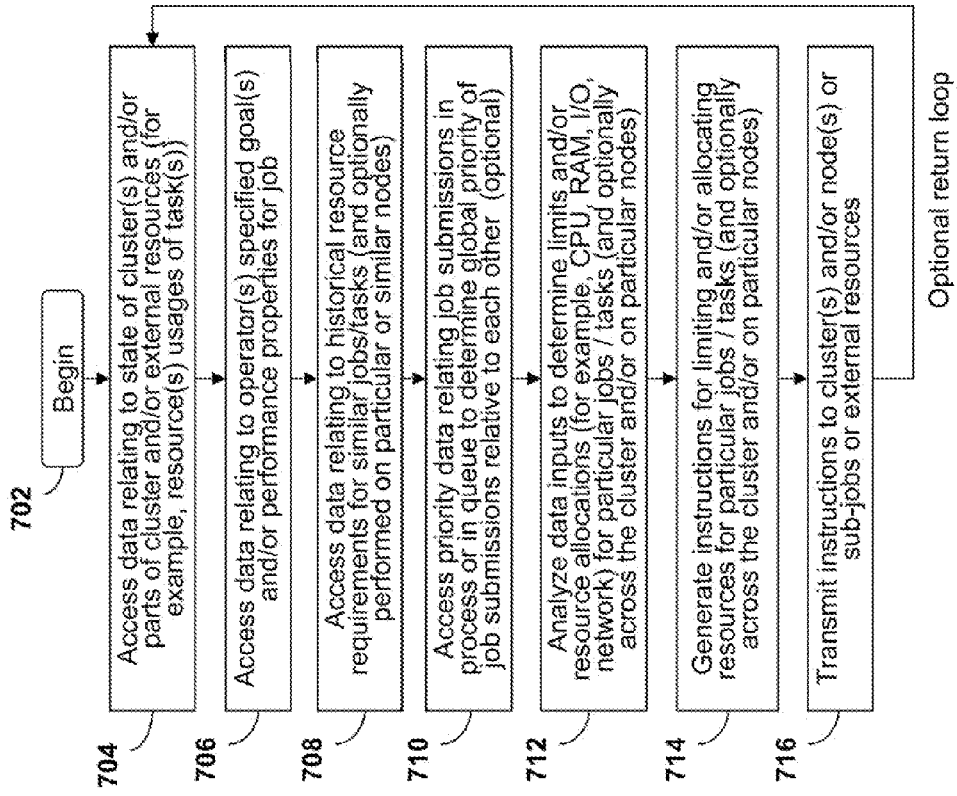
FIG. 7 is a flow chart depicting an embodiment of a process for a distributor as illustrated in FIG. 6.

FIG. 7 is a flow chart depicting an embodiment of a process for a distributor as illustrated in FIG. 6. In an embodiment, the process can begin at block 702 with the system accessing data at block 704. The data can be related to the state of a cluster(s) and/or parts of a cluster and/or external resources. For example, the system can be configured to access computer resource usage data relating to a particular job operating in a particular node. At block 706, the system can be configured to access data relating to operator(s) specified goal(s) and/or performance properties for a particular job.

At block 708, the system can be configured to access data relating to historical research requirements for similar jobs and/or tasks. In an embodiment, the system can be configured to optionally access historical data relating to historical resource requirements for similar jobs and/or tasks that are performed on particular or similar nodes. At block 710, the system can be configured to optionally access priority data relating to job submissions in process or in queue to determine global priority of job submissions relative to each other. At block 712, the system can be configured to analyze the data inputs to determine limits and/or resource allocations for particular jobs and/or tasks operating on particular nodes.

At block 714, the system can be configured to generate instructions for limiting and/or allocating resources for particular jobs and/or tasks that are operating on particular nodes. At block 716, the system can be configured to transmit the instructions to cluster(s) and/or node(s) or sub-jobs or external resources. At block 716, the process can be configured to end or it can be configured to optionally return to block 704 to repeat the process.

Figure 8A:
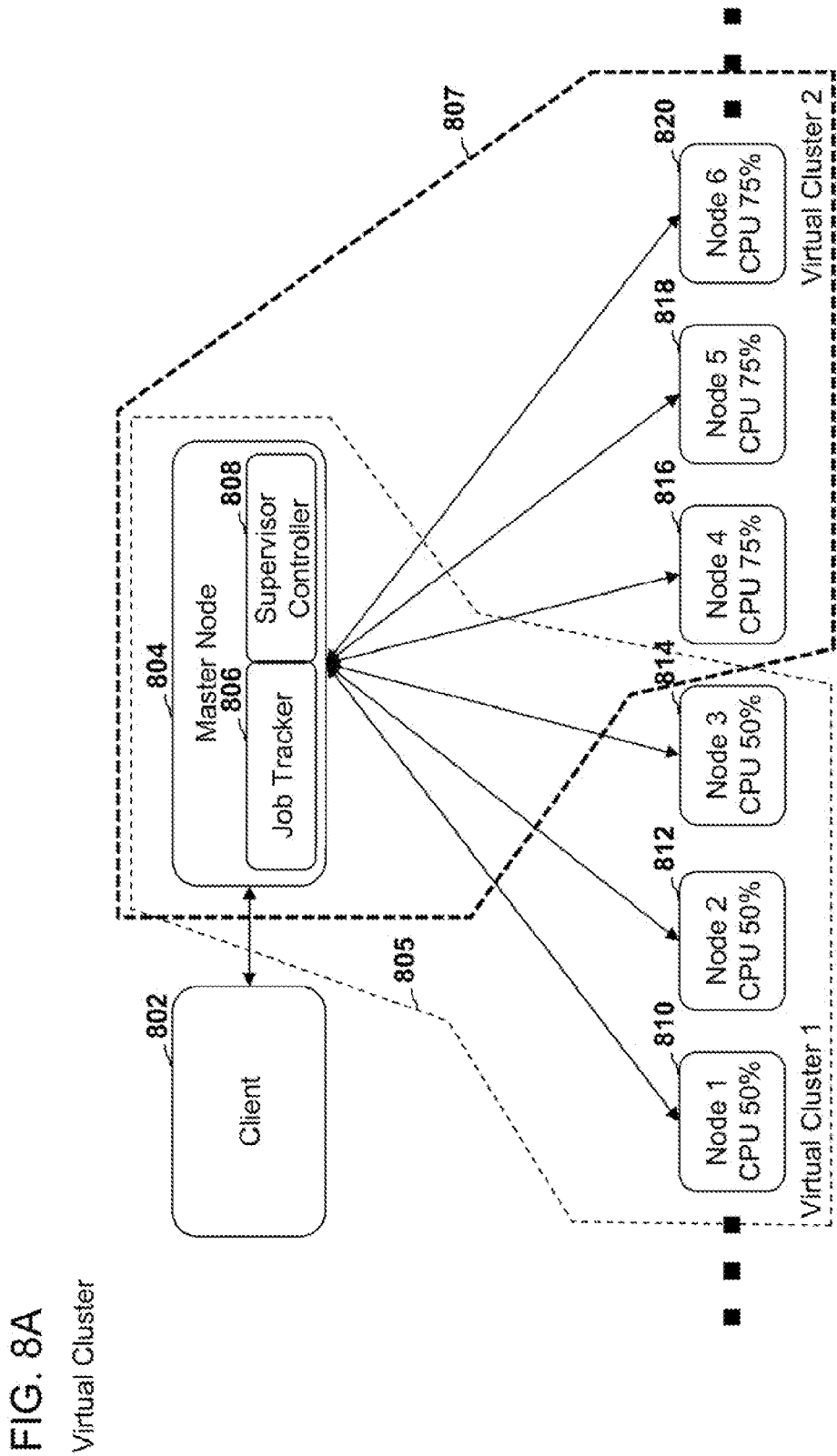
FIG. 8A is a block diagram depicting a high level overview of an embodiment of virtual clusters.

FIG. 8A is a block diagram depicting a high-level overview of an embodiment of virtual clusters. In an embodiment, the client 802 can be configured to submit jobs to a virtual cluster. As illustrated, client 802 can be configured to submit a job to a master node 804. The master node can comprise a job tracker or other management software 806 and a supervisor controller 808. In an embodiment, the job tracker or other management software 806 can be configured to analyze the job received from the client 802 in order to divide the job in to a plurality of sub-jobs for distribution and processing by various nodes in the cluster.

In an embodiment, the supervisor controller 808 can be configured to determine whether the job received from the client 802 should be processed on a first virtual cluster 805 or whether the job should be processed on a second virtual cluster 807. As illustrated in FIG. 8A, there is only one physical cluster for processing the job that is received from client 802. However, the supervisor controller 808 can be configured to dynamically create one or more virtual clusters from one physical cluster. For example, the supervisor controller 808 can be configured to allocate nodes 1, 2, and 3 to form a first virtual cluster 805 dedicated to processing certain jobs of the client 802 and the supervisor controller 808 can be configured to designate nodes 4, 5, and 6 as a second virtual cluster 807 that is dedicated to processing another type of job received from client 802.

The advantage of creating virtual clusters is an operator need not create separate physical clusters in order to have dedicated clusters for processing certain client jobs. Rather, the operator needs only one cluster that can be divided into one or more virtual clusters that are dedicated to certain client jobs. The advantage of virtual clusters over multiple physical clusters is operational simplicity. The operator need only maintain one physical cluster as opposed to multiple physical clusters. In an embodiment, the supervisor controller 808 can be configured to analyze the sub-jobs and/or the job submitted by the client 802 in order to determine which virtual cluster should process the job and/or sub-jobs.

In an embodiment, the supervisor controller 808 can be configured to determine that the job submitted by the client 802 is a high priority job. For high priority jobs, the supervisor controller 808 can be configured to submit the related sub-jobs to the second virtual cluster 807, which can process the sub-jobs faster because the nodes in the second virtual cluster 807 have been allocated with 75% CPU capacity. In contrast, the supervisor controller 808 can be configured to determine that a client job is a low priority job and therefore should be assigned to the first virtual cluster 805, which will process the sub-job slower than the second virtual cluster 807. The reason why the first virtual cluster will process the sub-job slower is because the nodes in the first virtual cluster 805 have only been allocated 50% of the CPU capacity of each node.

Figure 8B:
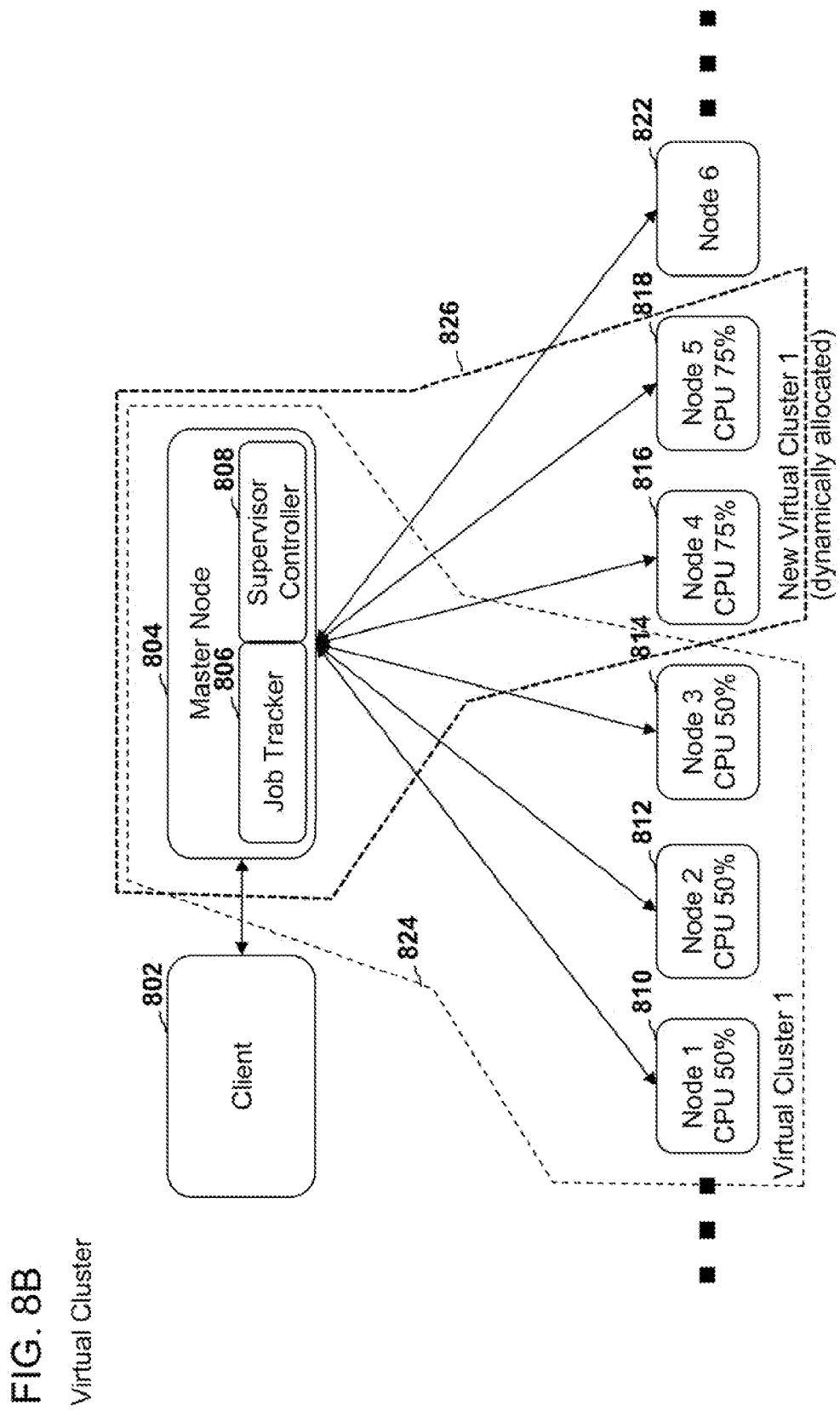
FIG. 8B is a block diagram depicting a high level overview of an embodiment of virtual clusters.

FIG. 8B is a block diagram depicting a high-level overview of an embodiment of virtual clusters. Similar to FIG. 8A, the client 802 can be configured to submit jobs to the master node 804. In contrast to FIG. 8A, the supervisor controller 808 can be configured to dynamically generate virtual clusters. As illustrated in FIG. 8B, the supervisor controller 808 initially created a first virtual cluster 824 comprising node 1, 810, node 2, 812, and node 3, 814. The supervisor controller 808 can be configured to dynamically generate a new first virtual cluster 826. The dynamic generation of virtual clusters can be advantageous for efficiently utilizing the computer resources of a cluster. For example, the supervisor controller 808 can be configured to analyze the nodes of a cluster in order to determine how to best create a virtual cluster.

In an embodiment, the supervisor controller 808 created the first virtual cluster 824 because the supervisor controller 808 determine that at the time there were three nodes having excess CPU capacity of 50%. The supervisor controller 808 can be configured to determine that the client-submitted job requires 150% of CPU capacity. Accordingly, the supervisor controller 808 can be configured to create the first virtual cluster 824 in order to satisfy the job requirement of the client 802. However, at another point in time, the supervisor controller 808 can be configured to determine that two additional nodes became free such that 75% of the CPU capacity on each of the nodes was available. In an embodiment, the supervisor controller 808 can be configured to determine that it is more efficient for processing a particular job using two nodes as opposed to processing the job over three nodes. For example, the use of two nodes can be faster for processing jobs. The sharing of data over three nodes requires more time than the sharing of data between two nodes. Accordingly, the supervisor controller 808 can be configured to dynamically create a new first virtual cluster 826 comprising node 4, 816, and node 5, 818, wherein each node can allocate 75% of the CPU capacity of each node to processing the job from the client 802.

Figure 8C:
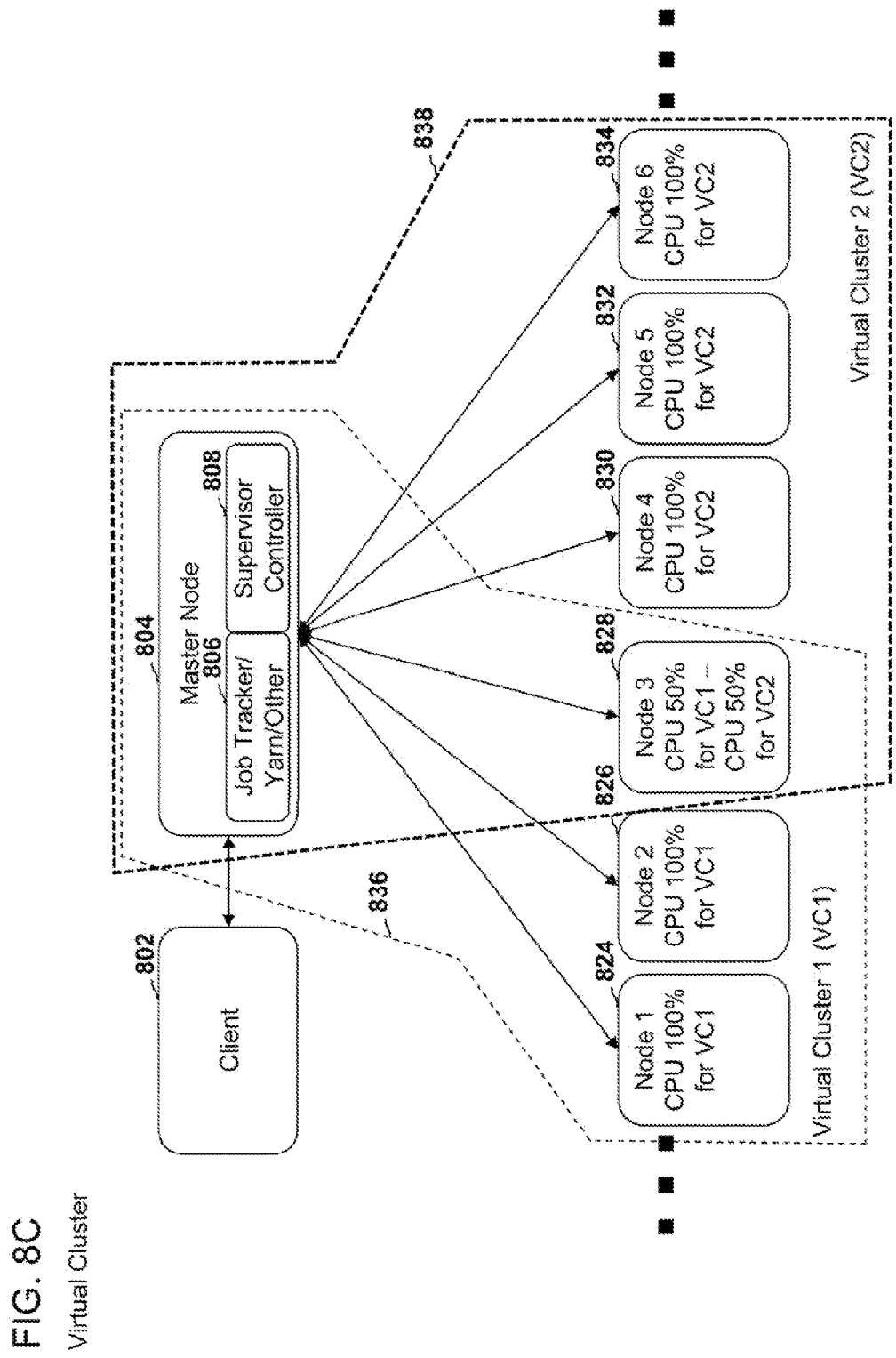
FIG. 8C is a block diagram depicting a high level overview of an embodiment of virtual clusters.

FIG. 8C is a block diagram depicting a high-level overview of an embodiment of virtual clusters. Similar to FIGS. 8A and 8B, the client 802 can be configured to submit jobs to the master node 804. In an embodiment, the supervisor controller 808 can be configured to create virtual clusters wherein certain nodes are part of one or more clusters. For example, the supervisor controller 808 can be configured to create the first virtual cluster 836 comprising node 1, 824, node 2, 826, and node 3, 824. With respect to node 1 and 2, the supervisor controller 808 can be configured to designate 100% of the CPU capacity for these nodes to be dedicated for the first virtual cluster 836.

With respect to node 3, the supervisor controller 808 can be configured to designate only 50% of the CPU capacity of this node for the first virtual cluster 836. The supervisor controller 808 can be configured to generate a second virtual cluster 838 comprising nodes 3, 828, node 4, 830, node 5, 932, and node 6, 834. In an embodiment, the supervisor controller 808 can be configured to designate that only 50% of the CPU capacity of node 3 should be dedicated to the second virtual cluster 838. With respect to nodes 4, 5, and 6, the supervisor controller 808 can be configured to designated 100% of the CPU capacity for these nodes to the second virtual cluster 838.

Figure 8D:
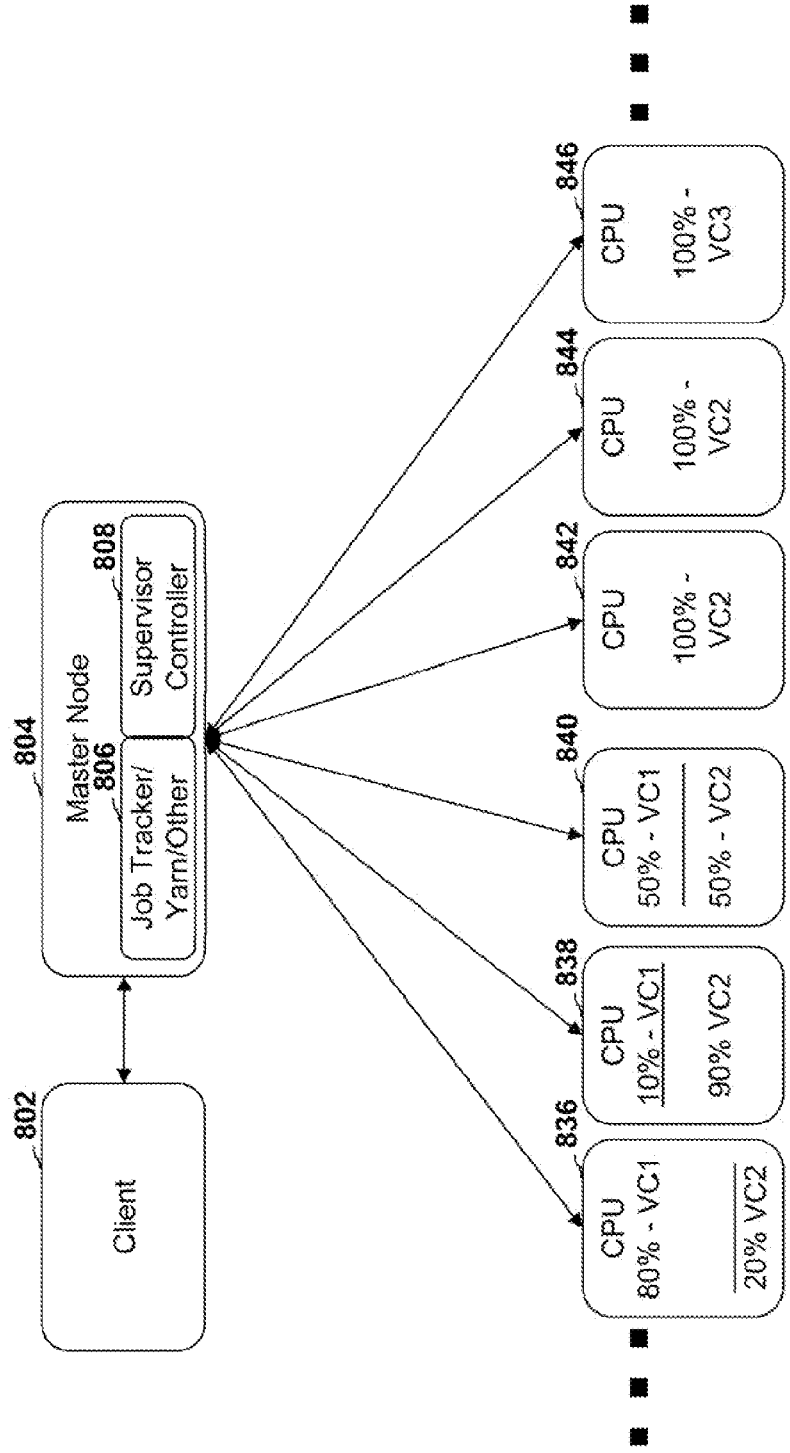
FIG. 8D is a block diagram depicting a high level overview of an embodiment of virtual clusters.

FIG. 8D is a block diagram depicting a high-level overview of an embodiment of virtual clusters. In an embodiment, the supervisor controller 808 can be configured to generate any number of virtual clusters based on the nodes of a single physical cluster. For example, the supervisor controller 808 can be configured to generate three virtual clusters. The supervisor controller 808 can be configured to generate a first virtual cluster comprising node 836, 838, and 840. The supervisor controller 808 can be configured to designate the node 836 to dedicate 80% of the CPU capacity to the first virtual cluster while designating only 10% of the CPU capacity of node 838 to the first virtual cluster and dedicating 50% of the CPU capacity of the node 840 to the first virtual cluster.

The supervisor controller 808 can be configured to generate a second virtual cluster comprising nodes 836, 838, 840, 842, and 844. The supervisor controller 808 can be configured to designate only 20% of the CPU capacity of the node 836 to the second virtual cluster while dedicating 90% of the CPU capacity of the node 838 to the second virtual cluster and dedicating 50% of the CPU capacity of the node 840 to the second virtual cluster and dedicating 100% of the CPU capacities of the nodes 842 and 844 to the second virtual cluster. The supervisor controller 808 can be configured to generate a third virtual cluster comprising node 846. The supervisor controller 808 can be configured to designate that 100% of the CPU capacity of the node 846 be dedicated to the third virtual cluster.

Figure 8E:
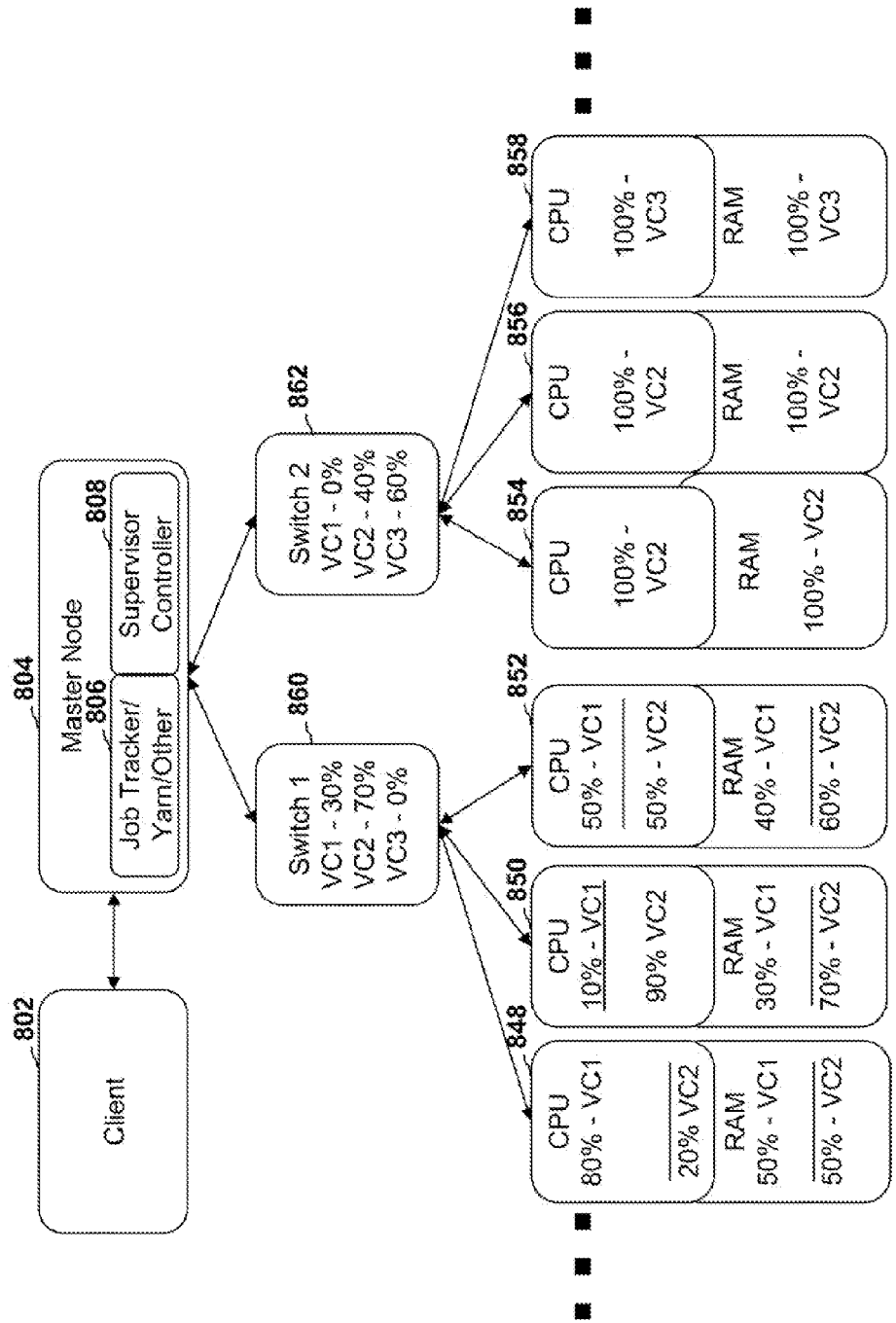
FIG. 8E is a block diagram depicting a high level overview of an embodiment of virtual clusters.

FIG. 8E is a block diagram depicting a high-level overview of an embodiment of virtual clusters. Similar to FIG. 8A, the client 802 can be configured to submit jobs for processing on a cluster to a master node 804. In an embodiment, the supervisor controller 808 can not only allocate CPU capacity on particular nodes to specific virtual clusters, but also the supervisor controller 808 can be configured to dedicate other computing resources on the node to specific virtual clusters. For example, the supervisor controller 808 can be configured to dedicate 50% of RAM usage on node 848 to the first virtual cluster and to the second virtual cluster.

In addition to dedicating computer resources at particular nodes to specific virtual clusters, the supervisor controller 808 can also be configured to dedicate computer resources of other devices in the cluster or connected to the cluster to specific virtual clusters. For example, the supervisor controller 808 can be configured to dedicate 30% of the switch utilization of a first switch 860 to the first virtual cluster. Similarly, the supervisor controller 808 can be configured to allocate 0% of a switch usage of a second switch 862.

Figure 9:
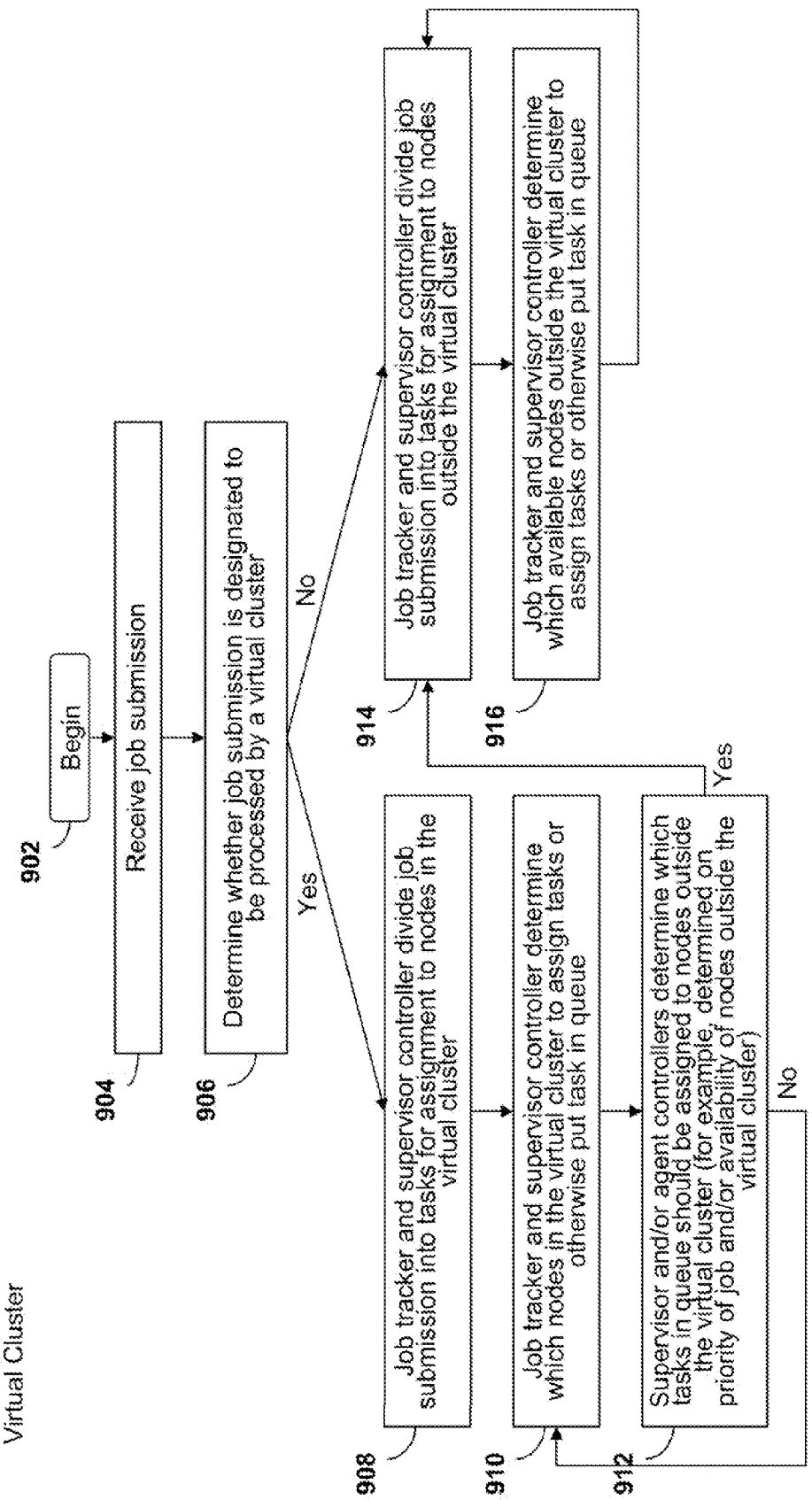
FIG. 9 is a flowchart depicting an embodiment of a process for processing jobs using a virtual cluster.

FIG. 9 is a flow chart depicting an embodiment of a process for processing jobs using a virtual cluster. At block 902 the process can begin with a job being received at block 904. The system can be configured to determine whether the submitted job is designated to be processed by a virtual cluster. If the determination is yes, then at block 908, the job tracker or other management software, and/or supervisor controller can be configured to divide the job into various sub-jobs for assignment to nodes in the virtual cluster designated by the system.

At block 910, the job tracker or other management software, and/or supervisor controller can be configured to determine which node(s) in the virtual cluster to assign the task or otherwise put the task in a queue for later processing. At block 912, the supervisor and/or agent controllers can be configured to determine which task in the queue should be assigned to nodes outside the virtual cluster. For example, the supervisor and/or the agent controllers can be configured to determine that the job is a high priority job and therefore should be processed as soon as possible using other nodes outside the virtual cluster.

In another example, the supervisor and/or the agent controllers can be configured to determine that other nodes outside of the virtual cluster have computer resources available for processing job(s). Accordingly, the supervisor and the agent controllers can be configured to assign sub-jobs in the queue to available nodes outside the virtual cluster at block 914. If at block 912, the supervisor and/or the agent controller determine that a sub-job in the queue should not be assigned to marriage outside of the virtual cluster, the process can return to block 910 where the job tracker or other management software, and the supervisor controller can be configured to determine which node in the virtual cluster to assign a sub-job.

If the determination at block 906 is no, then at block 914 the job tracker or other management software, and supervisor controller can be configured to divide the job submission into sub-jobs for assignment to nodes outside the virtual cluster. At block 916, the job tracker and/or supervisor controller can be configured to determine which available nodes outside the virtual cluster to assign the sub-jobs, or otherwise put the sub-job in a queue for later processing.

Figure 10:
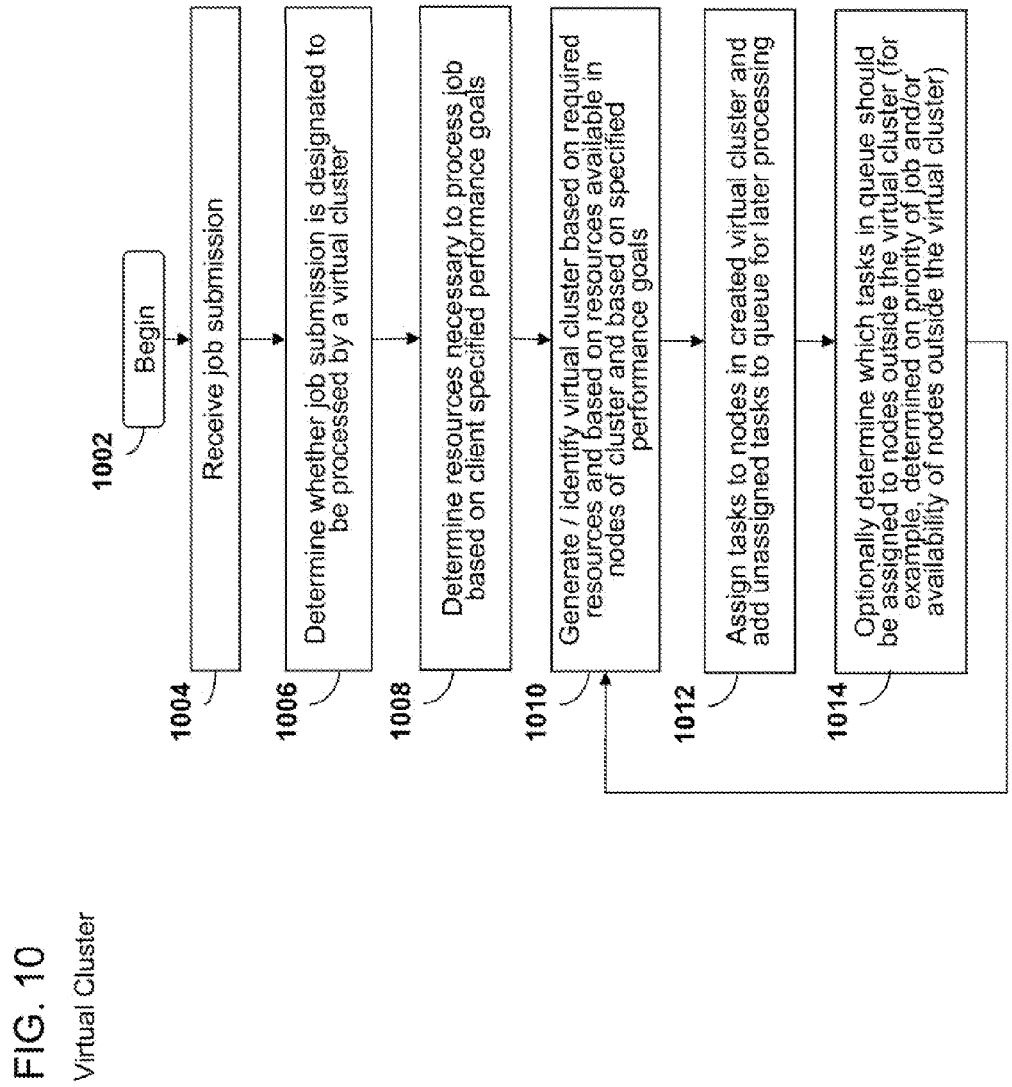
FIG. 10 is a flowchart depicting an embodiment of a process for processing jobs using a virtual cluster.

FIG. 10 is a flowchart depicting an embodiment of a process for processing jobs using a virtual cluster. The process can begin at 1002 with receiving a job submission at block 1004. At block 1006, the system can be configured to determine whether a job submission is designated to be processed by a virtual cluster. At block 1008, the system can be configured to determine the resources necessary to process the job based on the client specified performance goals. At block 1010, the system can be configured to generate and/or identify a virtual cluster based on the required resource necessary for processing the job and/or based on the resources available in the nodes of the cluster and/or based on the specified performance goals of the user/client.

At block 1012, the system can be configured to assign sub-jobs to the nodes in the created virtual cluster and can be configured to add the assigned sub-jobs to a queue for later processing. At block 1014, the system can be configured to optionally determine which sub-jobs in the queue should be assigned to nodes outside the virtual cluster. At block 1014, the system can be configured to optionally return to block 1010 where a virtual cluster is identified for processing the jobs in the queue.

Figure 11:
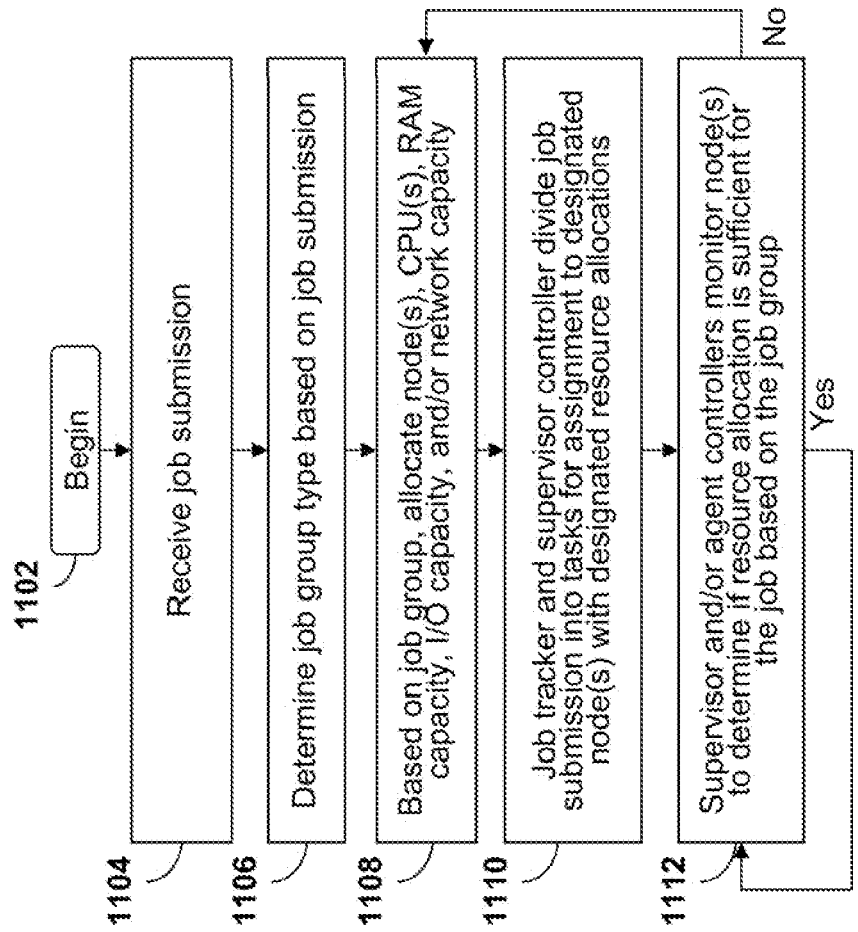
FIG. 11 is a flowchart depicting an embodiment of a process for processing jobs using job groups.

FIG. 11 is a flowchart depicting an embodiment of a process for processing jobs using job groups. The process can begin at block 1102 with receiving a job submission at block 1104. The system can be configured to determine at block 1106 a job group type based on the job submission and/or the job submission requirements. At block 1108, the system can be configured to allocate based on the job group identification CPU capacity, RAM capacity, disk I/O capacity, and/or network capacity. At block 1110, the job tracker and/or the supervisor controller can be configured to divide the job submission into sub-jobs for assignment to designated nodes with designated resource allocations. At block 1112, the supervisor and/or the agent controller can be configured to monitor the nodes to determine if resource allocations are sufficient for the jobs to be processed based on the job group designation. If the determination is yes, then system can be configured to optionally return to block 1112 to continue monitoring the acceptability of the resource allocation. If the determination at block 1112 is no, then the system can be configured to return to block 1108 in order to allocate nodes with specific CPU capacities, RAM capacities, disk I/O capacity, and/or network capacities for processing the job based on the designated job group.

Figure 12:
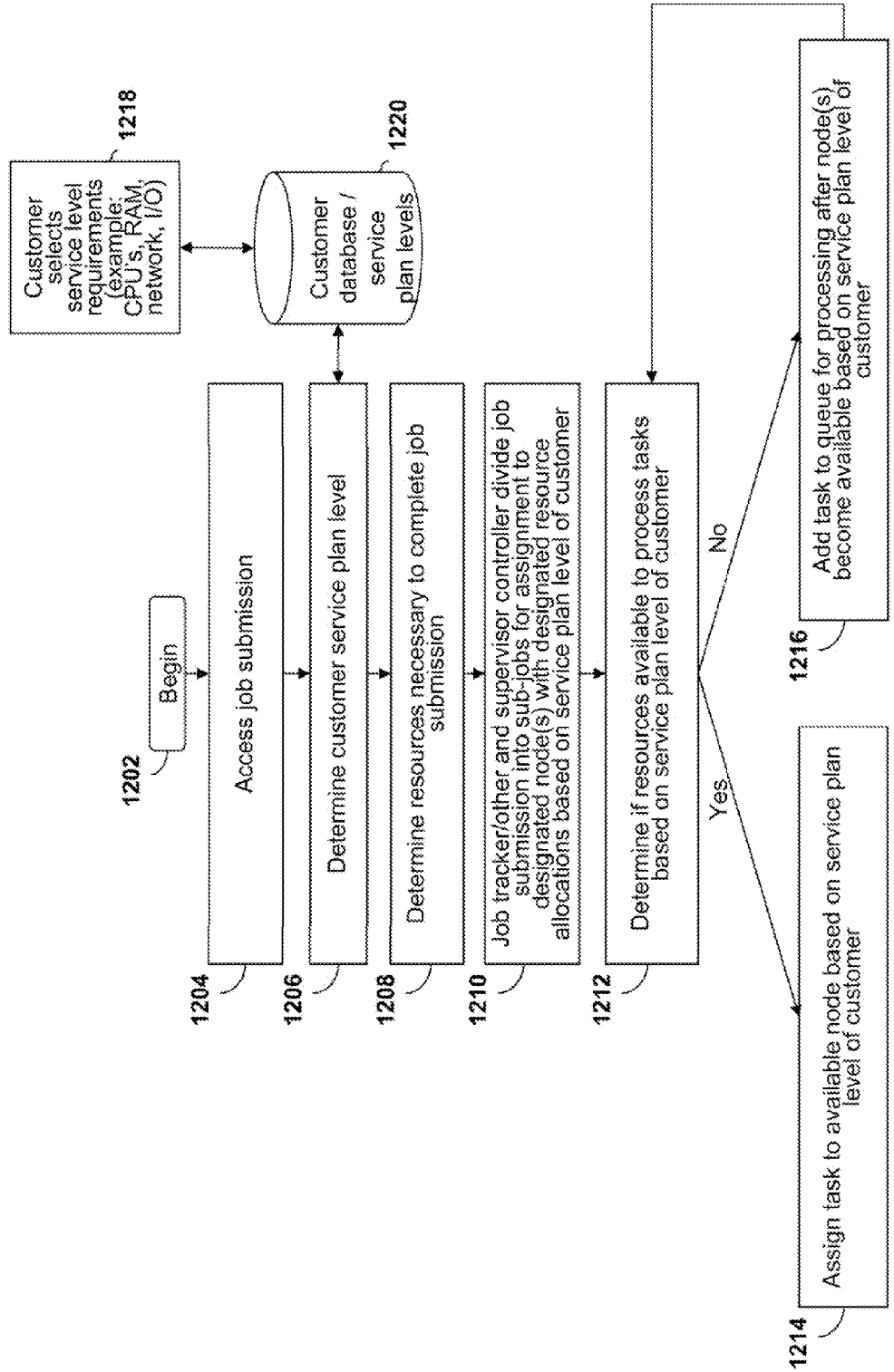
FIG. 12 is a flowchart depicting an embodiment of a process for monetizing and/or budget accounting for resources on a computer cluster.

FIG. 12 is a flowchart depicting an embodiment of a process for monetizing resources on a computer cluster, for example, selling computer resources on a cluster to customers. In an embodiment, the selling of computer resources is different from selling virtual machines because the latter requires that whole virtual machines be sold to customers whereas the former requires only the computer resources to be sold to the customer. The selling of computer resources can be more efficient and/or more cost effective for the customer and/or the operator of the cluster.

One of the ordinary skill in the art will appreciate that the monetizing or selling of computer resources need not require the actual sale of computer resources for currency but rather can also be applied to the context where resources are accounted for through intra-company budgeting. For example, the system can be configured to provide computer resources of the cluster to departments (for example, legal department, marketing department, human resources department, and the like) of a company based on a service plan level assigned to the department. In an embodiment, the service plan level assigned to a company department can equate to a budgetary accounting to the department for the company's costs in operating and maintaining the computer cluster.

The process can begin at block 1202 with the accessing of a job submission at block 1204. The system can be configured to determine at block 1206 a customer service plan level for the particular job submission. The system can be configured to determine the customer service plan level by accessing the customer database/service plan levels database 1220. Customers can select service level requirements and/or plans at block 1218 where such data is stored in the customer database/service plans levels database 1220.

At block 1208, the system can be configured to determine the resources necessary to complete the job submission. At block 1212, the job tracker or are other management software and/or the supervisor controller can be configured to divide the job submission into some jobs for assignment to designated nodes with designated resource allocations based on the service plan level of the customer. At block 1212, the system can be configured to determine if resources are available to process the sub-job based on the service plan level of the customer. If the determination is yes, then at block 1214 the system can be configured to assign the sub-job to an available node based on the service plan level of the customer. If the determination at block 1212 is no, then the system can be configured to add the sub-job to a queue for processing after a node becomes available based on the service plan level of the customer. In an embodiment, the customer selection of service level requirements can be specified differently for a particular job from a customer. For example, a customer may specify a higher service level for an urgent job than for that customer's usual jobs, and if meeting that higher service level requires additional resources, the system can be configured to charge the customer more for running that job or sub-job than if the customer had received the usual service level.

Figure 13:
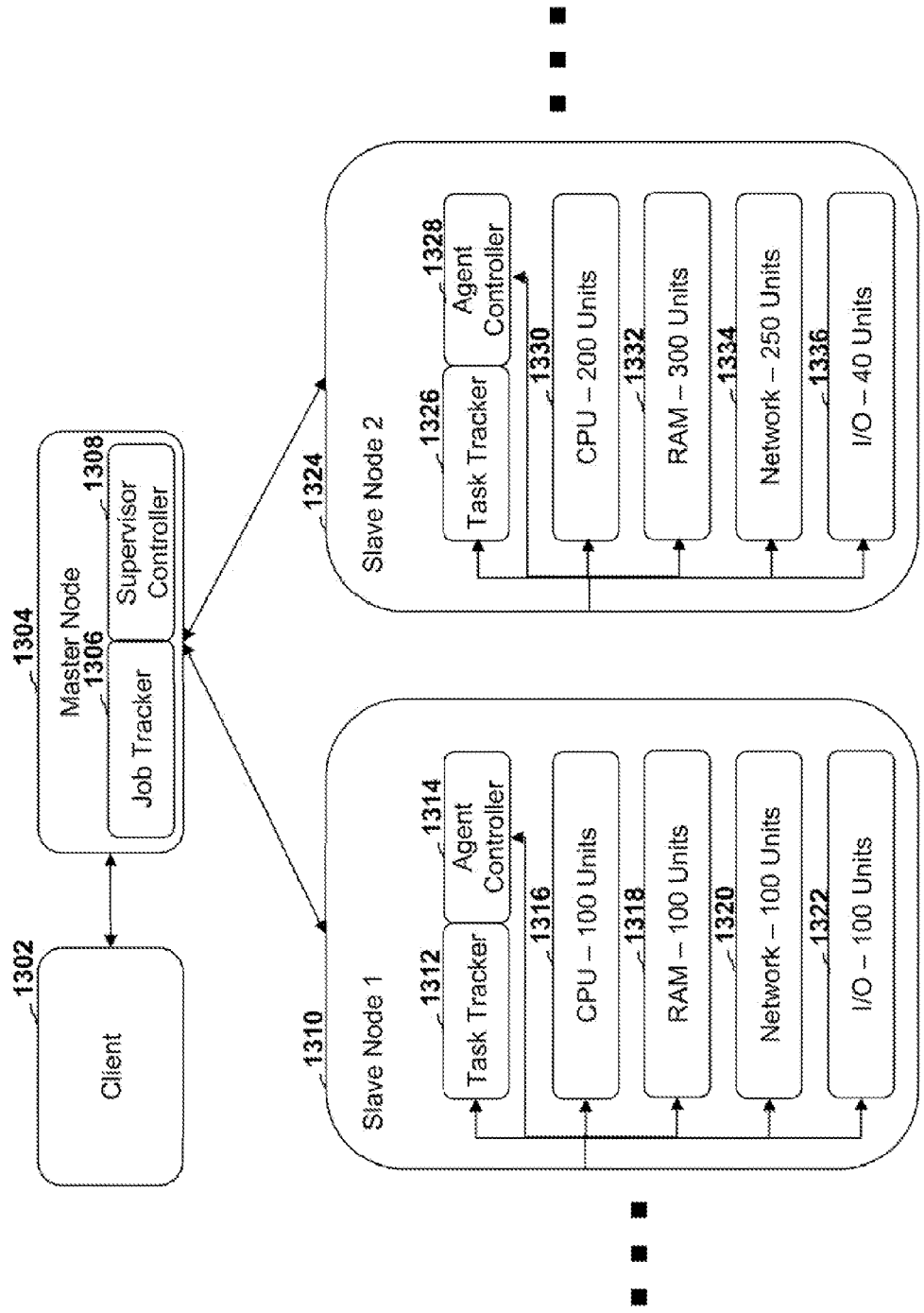
FIG. 13 is a block diagram depicting a high level overview of an embodiment of a computer cluster comprising heterogeneous nodes.

FIG. 13 is a block diagram depicting a high level overview of an embodiment of a computer cluster comprising heterogeneous nodes. In an embodiment, client 1302 can submit jobs for processing on cluster 1301 to master node 1304. In an embodiment, the master node 1304 can comprise a job tracker or other management software 1306 that can be configured to receive job submissions from the client 1302. The job tracker or other management software 1306 can be configured to analyze the job submission and/or be configured to divide the job into sub-jobs for processing by various nodes 1310, 1324 in the cluster 1301.

In an embodiment, the nodes 1310, 1324 can comprise a task tracker for other node manager 1312, 1326 and can comprise an agent controller 1314, 1328. The task tracker or other node manager 1312, 1326 can be configured to receive and/or tract the sub-job from the job tracker or other management software 1306. In an embodiment, the agent controller 1314, 1328 can be configured to also track and monitor the processing of the sub-job by the node. In an embodiment, the agent controller 1314, 1328 can also be configured to determine the total available computer resources that are provided for by a particular node 1310, 1324. For example, the node 1310 can provide a total of 100 units of CPU capacity 1316, 100 units of RAM capacity 1318, 100 units of network capacity 1320, and 100 units of IO capacity 1322.

By comparison, the node 1324 can provide 200 units of CPU capacity 1330, 300 units of RAM capacity 1332, 250 units of network capacity 1334, and 40 units of IO capacity 1336. In determining the total available computer resources provided for by a particular node, the agent controller 1314, 1328 can be configured to transmit such data to the supervisor controller 1308 in order for the supervisor controller to determine a global awareness of the total amount of computer resources available in the cluster.

In an embodiment, the agent controller 1314, 1328 can also be configured to determine the amount of computer resources utilized by the jobs being operated on by a particular noted. For example, the agent controller 1314, 1328 an be configured to determine that a particular job is utilizing 50 units of CPU capacity 1316 on node 1310. Further, the agent controller 1328 can be configured to determine that a second job is utilizing 100 units of CPU capacity 1330 on node 1324. The agent controller 1314, 1328 can be configured to transmit the CPU usage data to the supervisor controller 1308.

In an embodiment the agent controller 1314, 1328 can be configured to determine the amount of computer resources that are not being utilized at a particular node. For example, the agent controller 1314 can be configured to determine that 50 units of CPU capacity 1316 are not being utilized by the job being operated on by node 1310. Similarly, the agent controller 1328 can be configured to determine that 100 units of CPU capacity 1330 are not being utilized by the second job that is being operated on by node 1324. The agent controller 1314, 1328 can be configured to transmit the available unused computer resource data to the supervisor controller 1308. In an embodiment, the supervisor controller 1308 and/or the agent controller 1314, 1328 can be configured to allocate additional resources to existing jobs being operated on by nodes in the cluster or can be configured to allocate additional jobs or sub-jobs to the nodes in order to fully utilize the available computer resources that are provided for by the nodes.

As illustrated in FIG. 13, node 1310 and node 1324 provide differing amounts of computer resources. Accordingly the node 1310 and the node 1324 are not homogeneous but rather together make up a heterogeneous cluster because the cluster is said to have different kinds of computer servers that offer varying amounts of computer resources. By tracking the amount of available computer resources not being utilized by current jobs on the nodes, the agent controller 1314, 1328 can be configured to enable the efficient utilization of heterogeneous clusters.

In an embodiment, the agent controller 1314, 1328 in conjunction with the supervisors controller 1308 can be configured to fully utilize the available computer resources being offered by the heterogeneous cluster by allocating as many jobs to each of the different nodes based on each of the nodes available computer resources that can be utilized for processing additional jobs.

Figure 14:
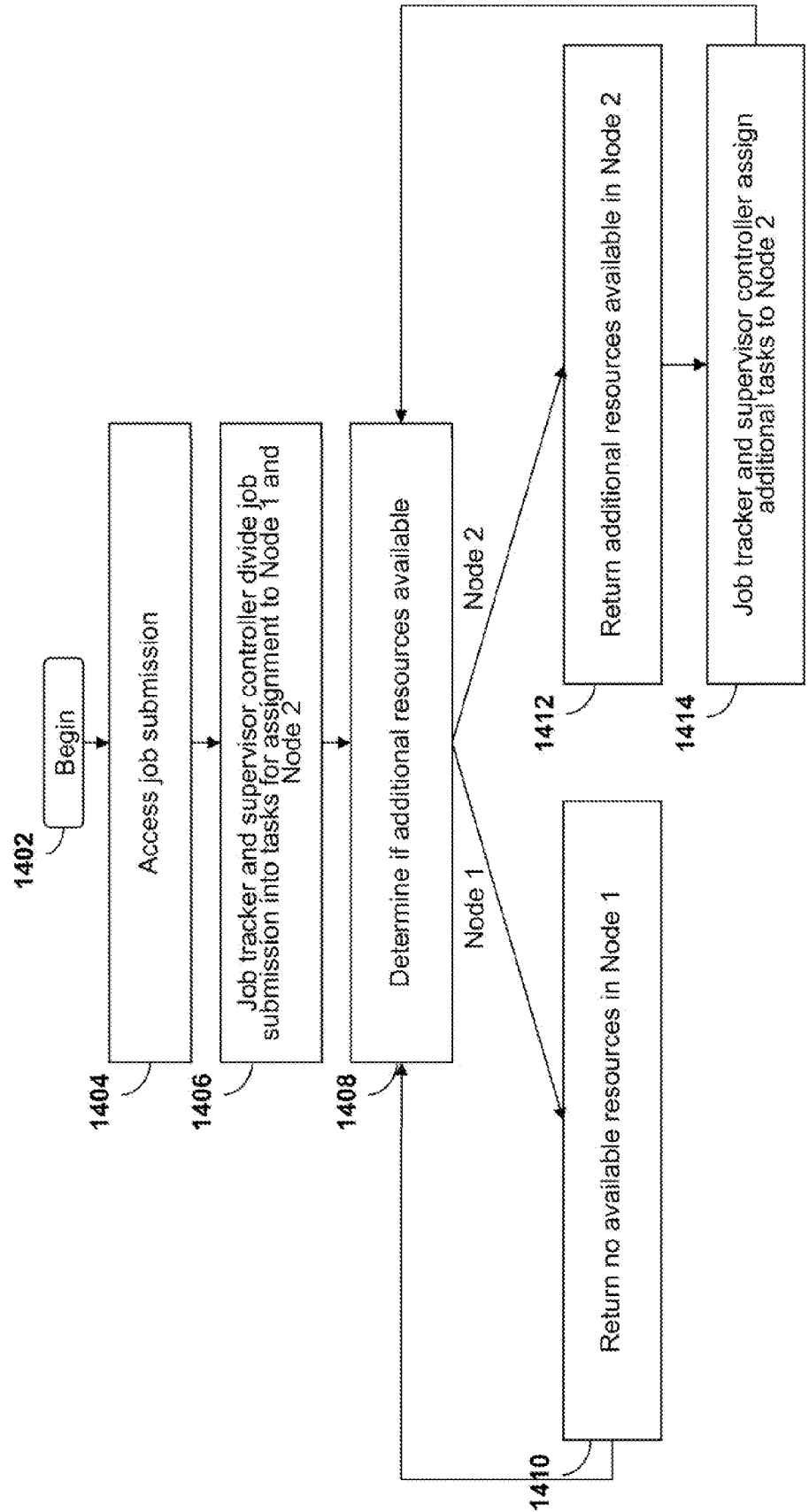
FIG. 14 is a flowchart depicting an embodiment of a process for processing jobs utilizing a heterogeneous computer cluster.

FIG. 14 is a flowchart depicting an embodiment of a process for processing jobs utilizing a heterogeneous computer clusters. The process can begin at block 1402 with the accessing of a job submission at block 1014. At block 1406, the job tracker or other management software, and/or supervisor controller can be configured to divide the job submission into tasks or sub-jobs for assignment to a first node and a second node. At block 1408, the agent controls operating on the first node and the second node can be configured to determine if additional computer resources are available for processing additional jobs. If the determination at node 1 is that no computer resources are available at node 1 for processing additional jobs, then at block 1410 the agent controller can be configured to loop back to block 1408 to continue to check whether the node 1 has additional resources available for processing other jobs because the utilization of computer resources on any particular node is continuously changing.

If the determination at node 2 is that there are additional resources available on node 2 for processing additional jobs, then the agent controller operating under node 2 can be configured to transmit the resource availability data of node 2 to the supervisor controller and/or job tracker or other management software operating on the master node. At block 414, the job tracker or other management software, and/or the supervisor controller can be configured to assign additional tasks for sub-jobs to the second node. At block 414 the agent controller can be configured to loop back to block 1408 to continuously check whether additional resources become available for processing other jobs. This process can enable the full utilization of heterogeneous clusters because the system continuously checks each node to determine whether additional computer resources are available for processing additional jobs.

Figure 15:
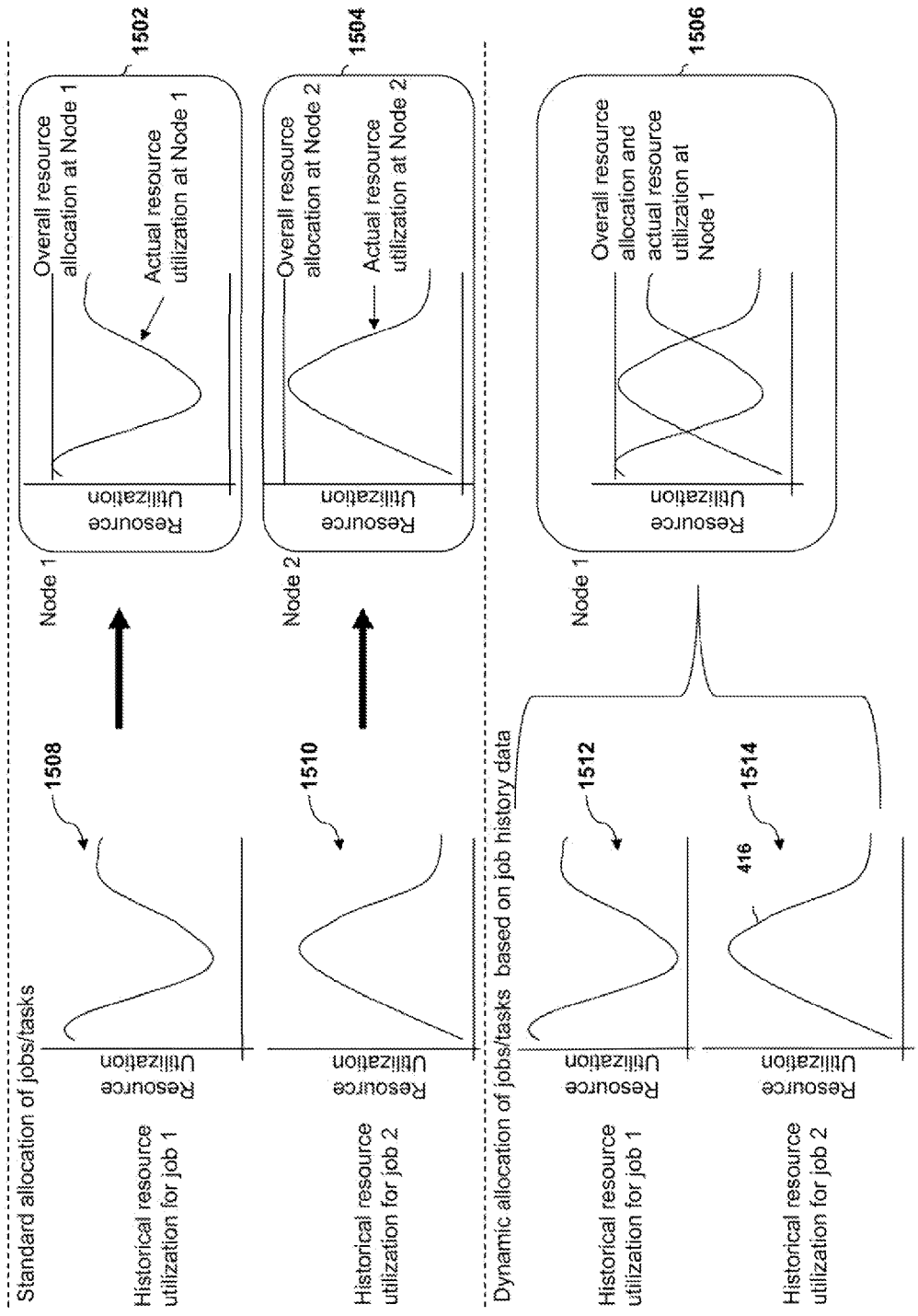
FIG. 15 is a schematic diagram illustrating an embodiment of utilizing job histories for improving resource allocation of a computer cluster.

FIG. 15 is a schematic diagram illustrating an embodiment of utilizing job histories for improving resource allocation of a computer cluster. The top half of FIG. 15 illustrates a standard allocation of sub-jobs and/or tasks. The bottom half of FIG. 15 illustrates a dynamic allocation of sub-jobs and/or tasks based on job history data. In an embodiment, a first job has a historical resource utilization chart illustrated in chart 1508. As can be seen, the first job has at first a high resource utilization at the beginning stages of processing the job and then has a period of low resource utilization in the middle of the period and towards the end of the period the first job has a high resource utilization.

A second job comprises a resource utilization illustrated in chart 1510. At the start, the second job has a low resource utilization and towards the middle period of the job, there is a high resource utilization and towards the end of the job there is very low resource utilization. A typical cluster system would assign job 1 to a first node and would assign job 2 to a second node. Chart 1502 illustrates the resource utilization of job 1 versus the overall resources available for allocation at node 1. Chart 1504 illustrates the resource utilization of job 2 relative to the overall resources available for allocation at node 2. As illustrated in charts 1502 and 1504, there are significant periods where the computer resources of node 1 and node 2 are underutilized because of the low resource utilization periods of job 1 and job 2. Accordingly it would be advantageous to operate jobs 1 and 2 on a single node in order to have full utilization of a particular node.

In an embodiment, the resource monitoring and allocation systems disclosed herein can be configured to allow for more efficient utilization of nodes by analyzing the historical resource utilization of jobs and predicting the utilization rates of particular jobs in order to combine certain jobs with other jobs that would allow for more efficient utilization of the resources available for allocation at a particular node. For example, as illustrated in chart 1512 and 1514, job 1 comprises a low resource utilization during the middle of the period for completing the job while job 2 has a high resource utilization rate during the middle period of completing the job. Accordingly by sending both job 1 and job 2 to a single node, there can be more efficient overall use of the computer resources available for allocation at node 1 as illustrated in chart 1506.

Figure 16:
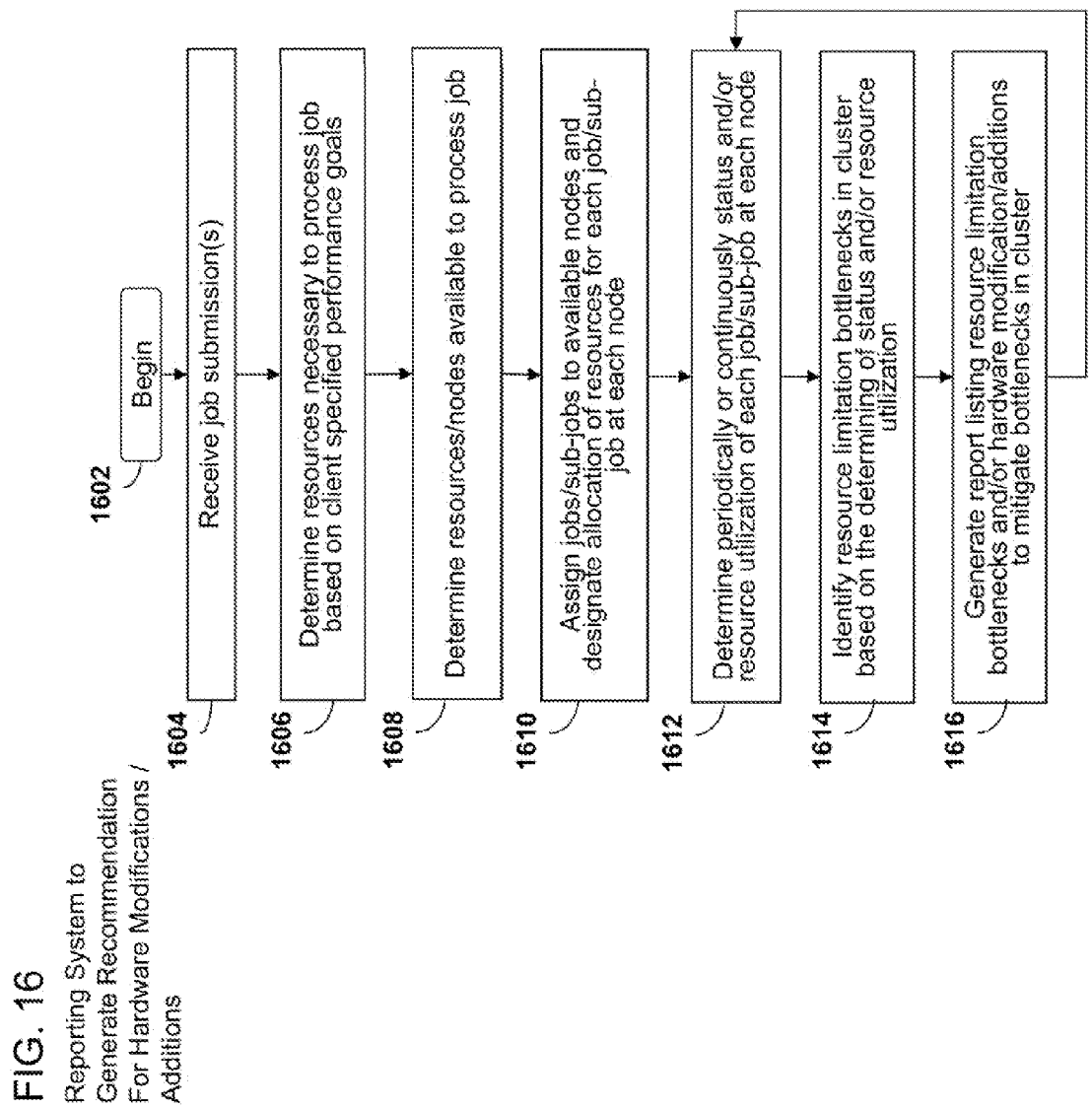
FIG. 16 is a flowchart depicting an embodiment of a process for generating reports relating to hardware modifications and/or additions to a computer cluster.

FIG. 16 is a flowchart depicting an embodiment of a process for generating reports relating to hardware modifications and/or additions to a computer cluster. The process can begin at block 1602 by receiving a job submission at block 1604. At block 1606, the supervisor controller can be configured to determine the resources necessary to process a job based on client specified performance goals. At block 1608, the supervisor controller can be configured to determine resources and/or nodes available to process the job. At block 1610, the job tracker or other management software can be configured to assign the sub-jobs to available nodes. In an embodiment, the supervisor controller can be configured to designate the allocation of computer resources for each sub-job at each node. At block 1612, the agent controller can be configured to determine periodically or continuously the status and/or resource utilization of each sub-job at each node.

At block 1614, the agent controller and/or the supervisor controller can be configured to identify resource limitation bottlenecks in the cluster based on the determining of the status and/or resource utilization at the various nodes in the cluster. At block 1616, the supervisor controller can be configured to generate a report listing resource limitation bottlenecks and/or hardware modifications and/or additions to mitigate bottlenecks in the cluster. At block 1616, the system can be configured to optionally loop back to block 1612 in order for the agent controller to periodically or continuously determine the status and/or resource utilization of each sub-job at each node.

FIG. 17 is a flowchart depicting an embodiment of a process for generating reports relating to resource reallocation on a computer cluster. The process can begin at block 1702 by receiving a job submission and at least one of a user identifier, job group, department, user group, or the like at block 1704. At block 1706, the supervisor controller can be configured to determine the resources necessary to process the job based on the client specified performance goals. At block 1708, the supervisor controller can be configured to determine the available resources and/or available nodes for processing the job. At block 1710, the job tracker or other management software or the supervisor controller can be configured to assign sub-jobs to the available nodes.

At block 1710, the supervisor controller can be configured to designate the allocation of resources for each sub-job at each node. At block 1712, the agent controller can be configured to determine periodically or continuously the status and/or resource utilization of each sub-job at each node. At block 1714, the supervisor controller can be configured to identify resource limitation bottlenecks in the cluster based on the determining of the status and/or resource utilization of the sub-jobs at the various nodes in the cluster. At block 1716, the supervisor controller can be configured to generate a report listing the resource limitation bottlenecks and/or at least one of the user identifiers, job groups, departments, user groups, or the like that is causing the bottlenecks. At block 1716, the system can be configured to loop back to block 1712 in order for the agent controller to determine periodically or continuously the status and/or resource utilization of each sub-job at each node.

Figure 17A:
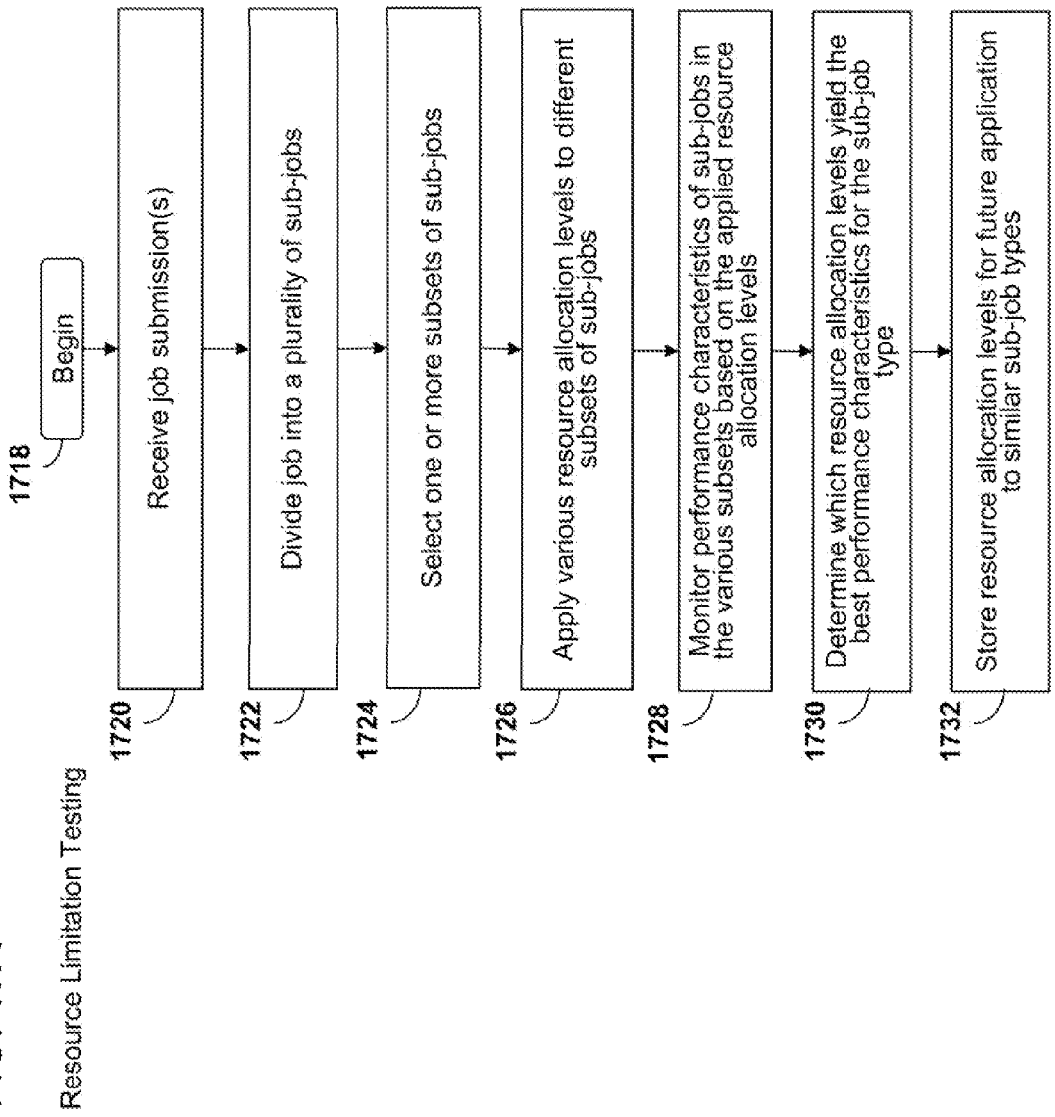
FIG. 17A is a flowchart depicting an embodiment of a process for determining resource reallocation levels for application to jobs or sub-jobs.

FIG. 17A is a flowchart depicting an embodiment of a process for determining resource reallocation levels for application to jobs or sub-jobs. In an embodiment, the system can be configured to select a subset of tasks and/or sub-jobs of a particular job and tweak the resource allocation settings or configurations for the selected subset of tasks and/or sub-jobs in order to discover how the tasks and/or sub-jobs react to the resource allocation settings. The system can be configured to apply different resource allocation settings or configurations to different subsets in order to determine the best resource allocation settings for applying to particular sub-jobs. For example, with respect to the java virtual machine heap setting, the system can be configured to set the java virtual machine heap setting to aggressively return unused memory. The system can be configured to monitor the performance characteristics of the sub-jobs based the foregoing setting. The system can be configured to use the resulting information to apply better control for future tasks or sub-jobs of the current job or the future instances of the job.

Similarly, the system can be configured to determine the actual current capacity of a resource, such as disk I/O capacity or network capacity by dynamically adjusting threshold levels for access to these resources by various tasks or sub-jobs. For example, the system can be configured to increase the network bandwidth requested by all tasks or sub-jobs (added together) over the course of several time intervals until the network stops providing the extra requested bandwidth, then assuming that observed maximum bandwidth provided is the currently available bandwidth. The system can be configured to repeat this process continuously so that each node maintains an estimate of the available maximum capacity for each resource.

With reference to FIG. 17A, in an embodiment, the process can begin at block 1718 with the system receiving a job submission at block 1720. At block 1722, the system can be configured to divide the job into a plurality of sub-jobs. At block 1724, the system can be configured to select one or more subsets of the sub-jobs for applying experiments of resource allocations to determine which resource allocation levels yield the best performance characteristics for the particular type of sub-jobs at issue. At block 1726, the system can be configured to apply various resource allocation levels to different subsets of sub-jobs. At block 1728, the system can be configured to monitor performance characteristics of sub-jobs in the various subsets based on the applied resource allocation levels. At block 1730, the system can be configured to determine which resource allocation levels yield the best performance characteristics for the sub-job type. At block 1732, the system can be configured to store the resource allocation level that yield the best performance characteristics for future application to similar sub-job types or other sub-jobs that are part of the overall job.

Figure 18:
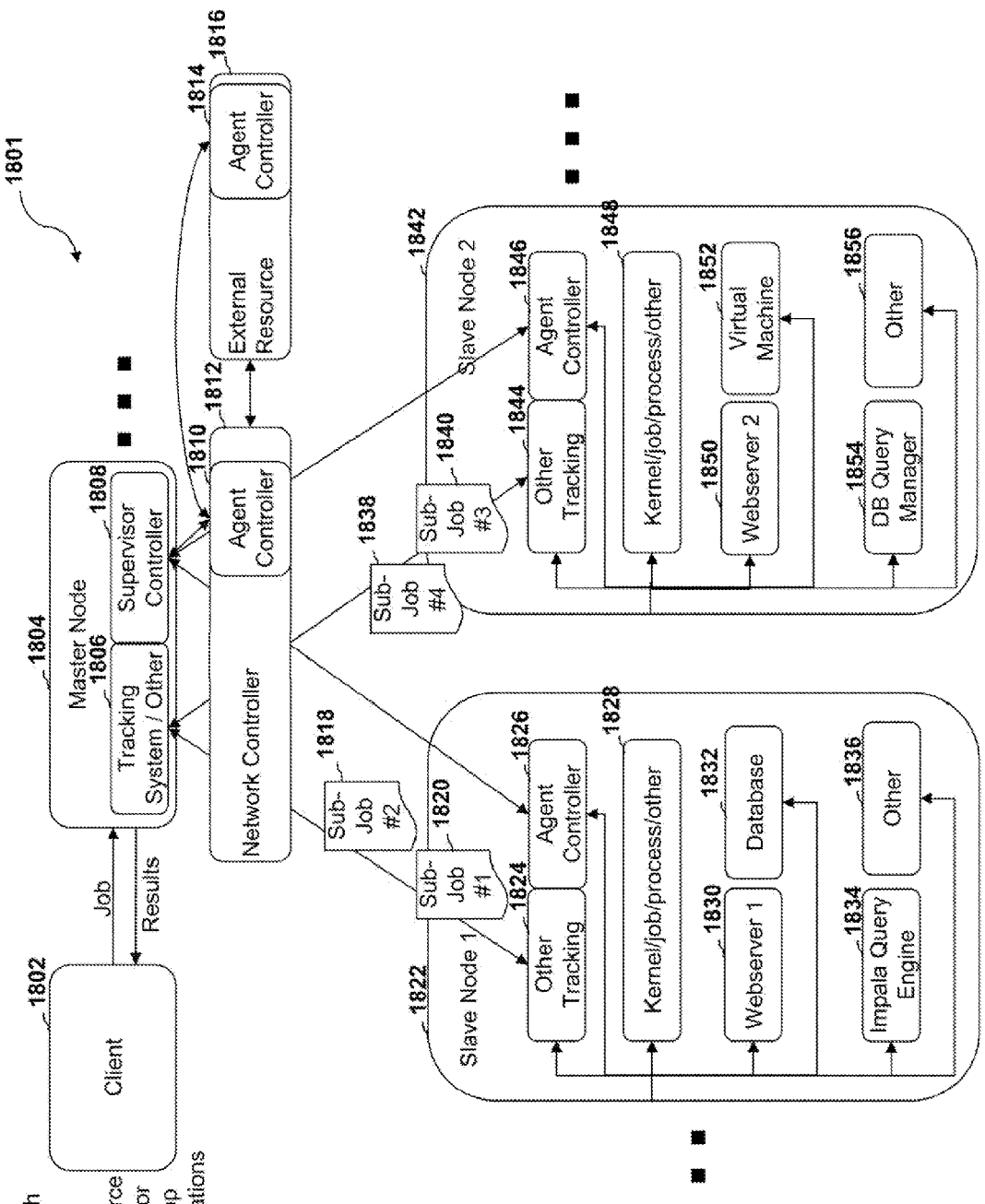
FIG. 18 is a block diagram depicting a high level overview of an embodiment of a computer cluster comprising a dynamic monitoring and/or resource allocation system.

FIG. 18 is a block diagram depicting a high level overview of an embodiment of a computer cluster comprising a dynamic monitoring and/or resource allocation system. In an embodiment, the client 1802 can submit jobs to the master node 1804 in order to have the job processed by the cluster 1801. The master node 1804 can comprise a management software 1806 and can comprise a supervisor controller 1808. In an embodiment, the management software 1806 can be configured to analyze the job received from the client 1802 and divide the job into various sub-jobs for processing by the various nodes in the cluster. The cluster 1801 can comprise a plurality of nodes 1822, 1842.

In an embodiment, the management software 1806 can be configured to send sub-jobs 1820, 1818, 1838, 1840 to the various nodes 1822, 1842 for processing. In an embodiment, the other tracking software 1824, 1844 can be configured to receive the sub-job from the master node in order for the sub-jobs to be processed on the nodes. In an embodiment, the agent controller 1826, 1846 can be configured to track the progress of the sub-jobs that are being processed by the nodes and can be configured to determine the resource allocation usage of each of the jobs running on each of the nodes.

In an embodiment the agent controller 1826, 1846 can be configured to transmit the resource utilization data to the supervisor controller 1808 that operates in the master node 1804. The supervisor controller 1808 and/or the agent controller 1826, 1846 can be configured to determine whether the resource allocation of a particular job on a particular node should be reduced or increased or remain the same. In an embodiment, the agent controller 1826, 1846 can be configured to generate instructions for processing at the kernel, the process, or other module 1828, 1848 in order to reduce, increase, or keep the resource allocation for the particular sub-job at a particular node.

In an embodiment, the nodes 1822, 1842 can be configured to run other software applications including but not limited to web server 1830, 1850, database 1832, virtual machine 1852, impala query engine 1834, database query manager 1854, and other software applications 1836, 1856. In an embodiment, the agent controller 1826, 1846 can be configured to determine the resource utilization of each of the software application running on the various nodes. In an embodiment, the agent controller 1826, 1846 can be configured to transmit the resource utilization of the software applications operating on each of the nodes to the supervisor controller 1808. The agent controller 1826, 1846 and/or the supervisor controller 1808 can be configured to determine that the resources being utilized by a particular software application on a particular node should be reduced, increased, or remain the same.

In an embodiment, the cluster 1801 can comprise a network controller 1812. The network controller 1812 can comprise a network router, a network switch, or the like. In an embodiment, the network controller 1812 can comprise a agent controller 1810. The agent controller 1810 can be configured to determine the resource utilization of the network controller 1810 by certain nodes, jobs, sub-jobs, or applications. In an embodiment, the agent controller 1810 can be configured to transmit the resource utilization data to the supervisor controller 1808. The supervisor controller 1808 and/or the agent controller 1810 can be configured to reallocate the use of resources provided for by the network controller 1810 for certain nodes, jobs, sub-jobs, and/or applications.

In an embodiment, the cluster 1801 can be coupled or connected to an external resource 1816. The external resource 1816 can include but is not limited to external databases, data extraction/transformation tools, web services, and the like. In an embodiment, the external resource 1816 can comprise an agent controller. The agent controller can be configured to determine the usage of resources of the external resource 1816 by nodes, jobs, sub-jobs, and/or applications. In an embodiment, the agent controller can be configured to transmit the resource utilization data to the supervisor controller 1808. In an embodiment, the supervisor controller 1808 and/or the agent controller 1814 can be configured to determine whether the resource utilization of the external resource 1816 by particular nodes, jobs, sub-jobs, and/or applications on a particular node should be reduced, increased, or remained the same.

Computer System

Figure 19:
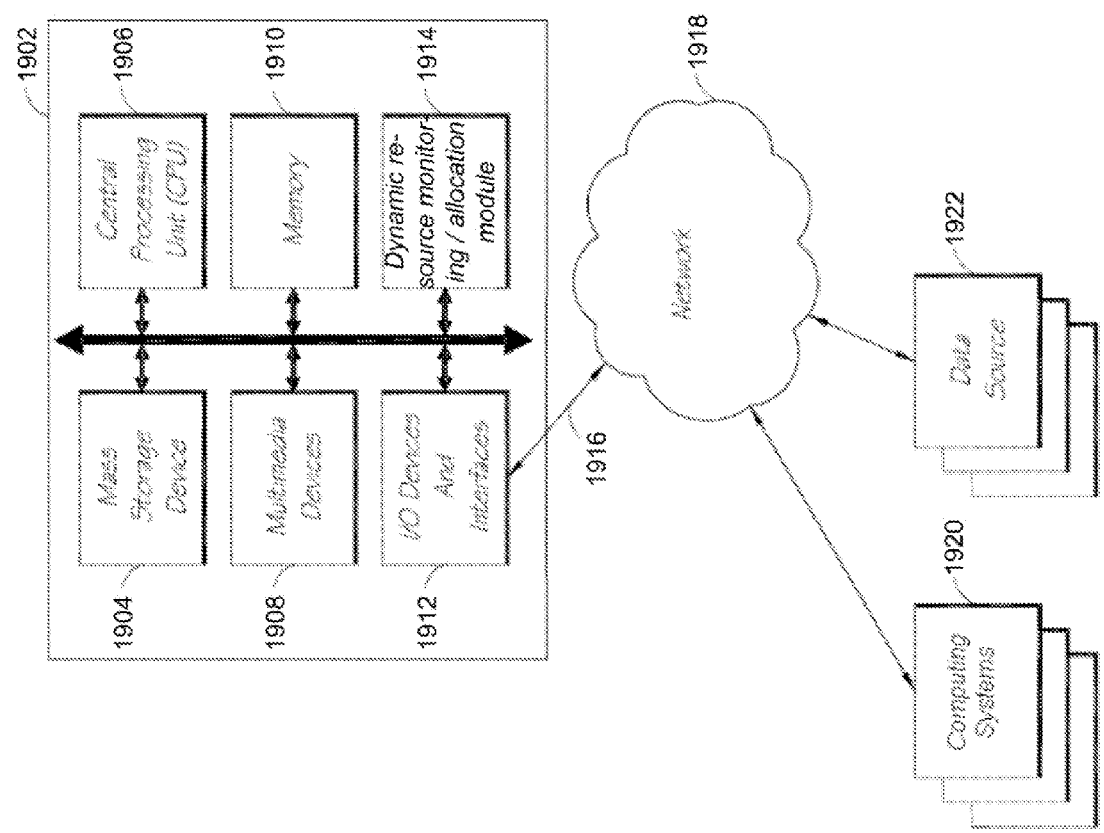
FIG. 19 is a block diagram depicting an embodiment of a computer hardware system configured to run software for implementing one or more embodiments of the dynamic monitoring and/or resource allocation systems disclosed herein.

In some embodiments, the systems, processes, and methods described above are implemented using a computing system, such as the one illustrated in FIG. 19. The example computer system 1902 is in communication with one or more computing systems 1920 and/or one or more data sources 1922 via one or more networks 1918. While FIG. 19 illustrates an embodiment of a computing system 1902, it is recognized that the functionality provided for in the components and modules of computer system 1902 may be combined into fewer components and modules, or further separated into additional components and modules.

Dynamic Resource Monitoring/Allocation Module

The computer system 1902 includes a dynamic resource monitoring/allocation module 1914 that carries out the functions, methods, acts, and/or processes described herein. The dynamic resource monitoring/allocation module 1914 is executed on the computer system 1902 by a central processing unit 1910 discussed further below.

In general the word "module," as used herein, refers to logic embodied in hardware or firmware or to a collection of software instructions, having entry and exit points. Modules are written in a program language, such as JAVA, C or C++, or the like. Software modules may be compiled or linked into an executable program, installed in a dynamic link library, or may be written in an interpreted language such as BASIC letters, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Computing System Components

The computer system 1902 includes one or more processing units (CPU) 1910, which may include a microprocessor. The computer system 1902 further includes a memory 1912, such as random access memory (RAM) for temporary storage of information, a read only memory (ROM) for permanent storage of information, and a mass storage device 1904, such as a hard drive, diskette, or optical media storage device. Alternatively, the mass storage device may be implemented in an array of servers. Typically, the components of the computer system 1902 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1902 includes one or more input/output (I/O) devices and interfaces 1908, such as a keyboard, mouse, touch pad, and printer. The I/O devices and interfaces 1908 can include one or more display devices, such as a monitor, that allows the visual presentation of data to a user. More particularly, a display device provides for the presentation of GUIs as application software data, and multi-media presentations, for example. The I/O devices and interfaces 1908 can also provide a communications interface to various external devices. The computer system 1902 may include one or more multi-media devices 1906, such as speakers, video cards, graphics accelerators, and microphones, for example.

Computing System Device/Operating System

The computer system 1902 may run on a variety of computing devices, such as a server, a Windows server, and Structure Query Language server, a Unix Server, a personal computer, a laptop computer, and so forth. In other embodiments, the computer system 1902 may run on a cluster computer system, a mainframe computer system and/or other computing system suitable for controlling and/or communicating with large databases, performing high volume transaction processing, and generating reports from large databases. The computing system 1902 is generally controlled and coordinated by an operating system software, such as z/OS, Windows 95, Windows 98, Windows NT, Windows 2000, Windows XP, Windows Vista, Windows 7, Linux, UNIX, BSD, SunOS, Solaris, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 1902 illustrated in FIG. 19 is coupled to a network 1918, such as a LAN, WAN, or the Internet via a communication link 1916 (wired, wireless, or a combination thereof). Network 1918 communicates with various computing devices and/or other electronic devices. Network 1918 is communicating with one or more computing systems 1920 and one or more data sources 1922. The dynamic resource monitoring/allocation module 1914 may access or may be accessed by computing systems 1920 and/or data sources 1922 through a web-enabled user access point. Connections may be a direct physical connection, a virtual connection, and other connection type. The web-enabled user access point may include a browser module that uses text, graphics, audio, video, and other media to present data and to allow interaction with data via the network 1918.

The output module may be implemented as a combination of an all-points addressable display such as a cathode ray tube (CRT), a liquid crystal display (LCD), a plasma display, or other types and/or combinations of displays. The output module may be implemented to communicate with input devices 1908 and they also include software with the appropriate interfaces which allow a user to access data through the use of stylized screen elements, such as menus, windows, dialogue boxes, tool bars, and controls (e.g., radio buttons, check boxes, sliding scales, and so forth). Furthermore, the output module may communicate with a set of input and output devices to receive signals from the user.

Other Systems

The computing system 1902 may include one or more internal and/or external data sources (e.g., data sources 1922). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1902 also accesses one or more databases 1922. The databases 1922 may be stored in a database or data repository. The computer system 1902 may access the one or more databases 1922 through a network 1918 or may directly access the database or data repository through I/O devices and interfaces 1908. The data repository storing the one or more databases 1922 may reside within the computer system 1902.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Additional Embodiments

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods may be carried out using any appropriate apparatus. Further, the disclosure herein of any particular feature, aspect, method, property, characteristic, quality, attribute, element, or the like in connection with an embodiment may be used in all other embodiments set forth herein. Thus, it is intended that the scope of the present invention herein disclosed should not be limited by the particular disclosed embodiments described above.

What is claimed is:

1. A hadoop computer cluster comprising:
    a master node computing device comprising a management controller and a supervisor controller, the management controller configured to coordinate parallel processing of data across a plurality of computer system nodes, the supervisor controller configured to coordinate allocation of system resources at particular computer system nodes to particular job processes, wherein the management controller comprises a job tracker or a yarn resource manager;
    the plurality of computer system nodes configured to communicate with the supervisor controller and to perform processing of received job processes, wherein the plurality of computer system nodes comprise task trackers or yarn node managers configured to communicate data to the job tracker or the yarn resource manager, the communicated data comprising a number of available slots or containers for processing tasks on a particular computer system node, the plurality of computer system nodes each comprising:
  one or more processors configured to perform computing processes on received job processes;
  an agent controller configured to:
    monitor utilization by job processes of system resources of the computer system node, the system resources comprising central processing unit, electronic storage input-output, network, and memory by the computer system node;
    report the monitored system resource utilization to the supervisor controller in substantially real-time; and
    generate instructions for controlling utilization by job processes of system resources of the computer system node, the instructions based on data received from the supervisor controller, the data comprising system resource allocation instructions generated by the supervisor controller,
  wherein the supervisor controller is configured to, based on goals specified by an operator of the hadoop computer cluster and the substantially real-time reporting from a plurality of agent controllers, determine assignment of system resource allocations for each job process on particular computer system nodes such that the operator-specified goals are satisfied and processing capabilities of the hadoop computer cluster are maximized, the goals specified by the operator of the hadoop computer cluster comprising a user group preference for each job process on the plurality of computer system nodes, wherein the supervisor controller is configured to assign a first level of system resource allocations to a first job process and a second level of system resource allocations to a second job process, wherein the first level is greater than the second level, wherein the first job process is associated with a first user group preference, and the second job process is associated with a second user group preference, wherein job processes associated with the first user group preference are processed with greater priority than job processes associated with the second user group preference, wherein the first and second user group preferences comprise at least one of a user identifier, job group, department, or set of users.

2. The hadoop computer cluster of claim 1, wherein the management controller and the supervisor controller operate on a single master node.

3. The hadoop computer cluster of claim 1, wherein the management controller and the supervisor controller operate on separate master nodes.

4. The hadoop computer cluster of claim 1, the supervisor controller is further configured to dynamically adjust system resource allocations for each job process on the plurality of computer system nodes.

5. The hadoop computer cluster of claim 4, the dynamic adjustment of system resource allocations is based on the substantially real-time reporting from the plurality of agent controllers.

6. The hadoop computer cluster of claim 5, wherein the dynamic adjustment of system resource allocations comprises allocating additional central processing unit resources to a job process operating on a computer system node based on the supervisor controller determining that a total amount of unused central processing unit resources available at the computer system node exceeds a threshold level.

7. The hadoop computer cluster of claim 5, wherein the dynamic adjustment of system resource allocations comprises allocating additional networking resources to a job process operating on a computer system node based on the supervisor controller determining that a total amount of unused networking resources available on the hadoop computer cluster exceeds a threshold level.

8. The hadoop computer cluster of claim 5, wherein the dynamic adjustment of system resource allocations comprises allocating additional random-access memory resources to a job process operating on a computer system node based on the supervisor controller determining that a total amount of unused random-access memory resources available on the hadoop computer cluster exceeds a threshold level.

9. The hadoop computer cluster of claim 5, wherein the dynamic adjustment of system resource allocations comprises allocating additional electronic storage input-output resources to a job process operating on a computer system node based on the supervisor controller determining that a total amount of unused electronic storage input-output resources available on the hadoop computer cluster exceeds a threshold level.

10. The hadoop computer cluster of claim 1, the goals specified by the operator of the hadoop computer cluster comprising a priority level for each job process on the plurality of computer system nodes.

11. The hadoop computer cluster of claim 10, wherein the supervisor controller is configured to assign a first level of system resource allocations to a first job process and a second level of system resource allocations to a second job process, wherein the first level is greater than the second level, wherein the first job process comprises a first priority level and the second job process comprises a second priority level, wherein the first priority level is greater than the second priority level.

12. A supervisor controller configured to manage system resource allocation for a hadoop computer cluster, the supervisor controller comprising:
  a management controller interface configured to communicate with a management controller to access data representing an assignment of a plurality of job processes across a plurality of computer system nodes in the hadoop computer cluster, the management controller configured to coordinate parallel processing of data across a plurality of computer system nodes, wherein the management controller comprises a job tracker or a yarn resource manager, wherein the plurality of computer system nodes comprise task trackers or yarn node managers configured to communicate slots data to the job tracker or the yarn resource manager, the communicated slots data comprising a number of available slots or containers for processing tasks on a particular computer system node,
  an agent controller interface configured to communicate with an agent controller, the agent controller configured to transmit to the agent controller interface data representing utilization of system resources by the plurality of job processes operating on a particular computer system node,
  a system resource allocation engine configured to dynamically determine system resource allocations for particular job processes operating on particular computer system nodes, the dynamic determination generated by the system resource allocation engine based on the data representing utilization of system resource by the plurality of job processes operating on the particular system node, and based on goals specified by an operator of the hadoop computer cluster, the goals comprising a user group preference for each job process on the plurality of computer system nodes, wherein the system resource allocation engine is configured to assign a first level of system resource allocations to a first job process and a second level of system resource allocations to a second job process, wherein the first level is greater than the second level, wherein the first job process is associated with a first user group preference, and the second job process is associated with a second user group preference, wherein job processes associated with the first user group preference are processed with greater priority than job processes associated with the second user group preference, wherein the first and second user group preferences comprise at least one of a user identifier, job group, department, or set of users; and the agent controller interface configured to generate data for transmission to the agent controller of a particular computer system node based on the dynamic determination generated by the system resource allocation engine, the data configured to instruct the agent controller to allocate a level of system resources to a particular job process operating on the particular computer system node.

13. The supervisor controller of claim 12, wherein the supervisor controller operates on a first computer system node of the hadoop computer cluster and the management controller operates on a second computer system node of the hadoop computer cluster.

14. The supervisor controller of claim 13, wherein the first and second computer system nodes are the same computer system node.

15. The supervisor controller of claim 12, the utilization of system resources comprising central processing unit resources, electronic storage input/output resources, network resources, and random-access memory resources.

16. The supervisor controller of claim 15, wherein the data for transmission to the agent controller comprises instructions to the agent controller to allocate a level of central processing unit resources to the particular job process operating on the particular computer system node.

* * * * *